United States Patent
Abousleman et al.

(10) Patent No.: US 8,417,060 B2
(45) Date of Patent: Apr. 9, 2013

(54) METHODS FOR MULTI-POINT DESCRIPTORS FOR IMAGE REGISTRATIONS

(75) Inventors: Glen Patrick Abousleman, Scottsdale, AZ (US); Huibao Lin, Natick, MA (US); Jennie Si, Phoenix, AZ (US)

(73) Assignee: Arizona Board of Regents for and on behalf of Arizona State University, Tempe, AZ (US)

( * ) Notice: Subject to any disclaimer, the term of this patent is extended or adjusted under 35 U.S.C. 154(b) by 1117 days.

(21) Appl. No.: 11/688,660

(22) Filed: Mar. 20, 2007

(65) Prior Publication Data

US 2007/0286526 A1 Dec. 13, 2007

Related U.S. Application Data

(60) Provisional application No. 60/784,495, filed on Mar. 20, 2006.

(51) Int. Cl.
*G06K 9/36* (2006.01)
(52) U.S. Cl. .......................... 382/284; 382/287
(58) Field of Classification Search .................. None
See application file for complete search history.

(56) References Cited

U.S. PATENT DOCUMENTS 6,005,987 A * 12/1999 Nakamura et al. ............ 382/294

OTHER PUBLICATIONS

Hansen et al., "Real-time scene stabilization and mosaic construction," *IEEE Workshop on Applications of Computer Vision*, pp. 54-62, 1994.
Lin et al., "Dynamic point selection in image mosaicking," *Optical Engineering*, 45, 2003.
Lin et al., "Fast and Robust Image Mosaicking for Monocular Video," *Proc. SPIE*, 5809:443-452, 2005.
Mann and Picard, "Virtual Bellows: Constructing high quality images from video," *IEEE International Conf. on Image Processing*, pp. 363-367, 1997.
Nicolas, "New Methods for dynamic mosaicking," *IEEE Trans. Image Processing*, 10:1239-1251, 2001.
Schechner and Nayar, "Generalized mosaicking: Wide field view multispectral imaging," *IEEE Trans. Pattern Anal. Machine Intell.*, 24:1334-1348, 2002.
Shum and Szeliski, "Systems and experiment paper: Construction of panoramic image mosaics with global and local alignment," *Int. J. Computer Vision*, 36:101-130, 2000.

* cited by examiner

Primary Examiner — Randolph I Chu
(74) Attorney, Agent, or Firm — Fulbright & Jaworski L.L.P.

(57) ABSTRACT

Methods for generating an image mosaic are provided. In one respect, pixels saliency of a first image and a second image are determined. One salient pixel may be selected from the determined pixels saliency group of the first image and one salient pixel may be selected from the determined pixels saliency group of the second image. A mosaicking technique of the first and second image may be performed if the one salient pixel of the first image and the one salient pixel of the second image are registered successfully.

19 Claims, 15 Drawing Sheets

```
for i from 1 to K step size 1, loop
    for j from 1 to K step size, loop
        if e_{i,j} = 1, then
            for k from j + 1 to K step size, loop
                if e_{i,k} = 1 and e_{j,k} = 1, then
                    Let î, ĵ, and k̂ be the minimum, medium, and maximum of i, j, k respectively
                    If B(î, ĵ, and k̂) = 0 then
                        B(î, ĵ, and k̂) ← 1
                        n ← n+1
                        Tn ← (î, ĵ, and k̂)
                    end if
                end if
            end loop
        end if
    end loop
end loop
```

FIG. 4

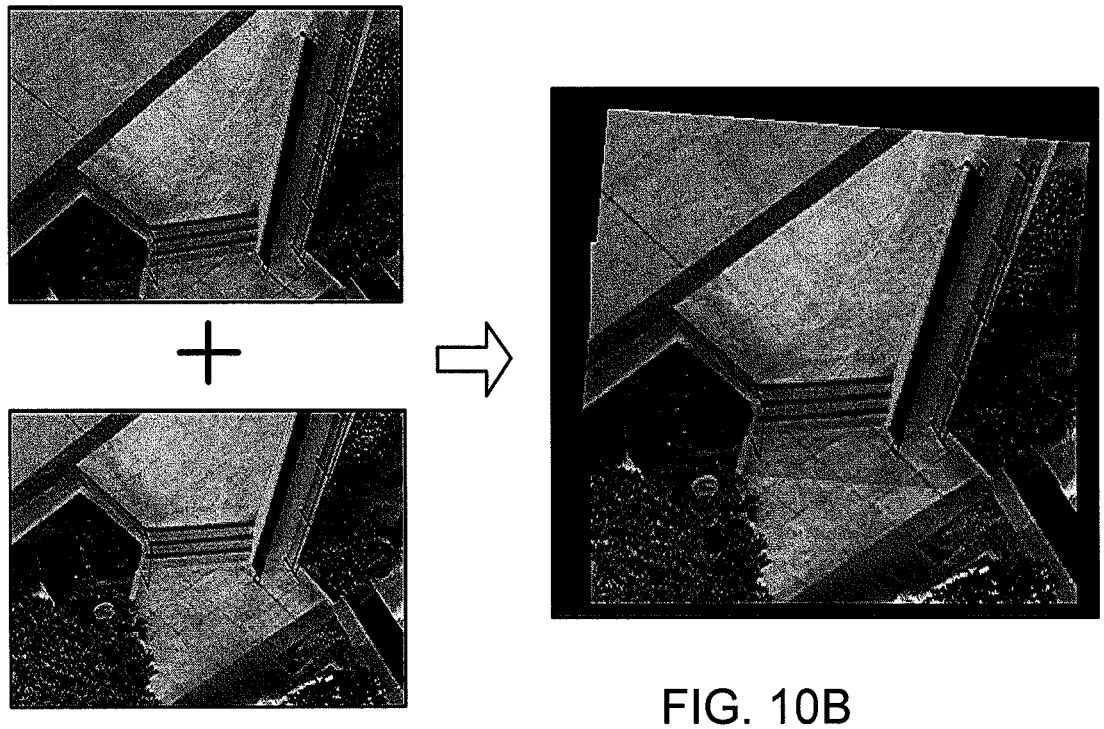
FIG. 10A
FIG. 10B
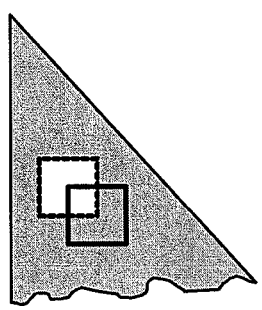
FIG. 12A
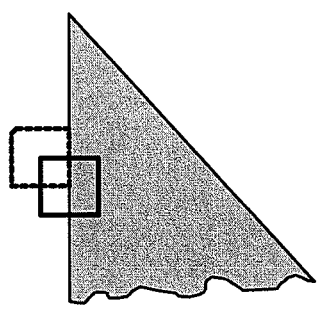
FIG. 12B
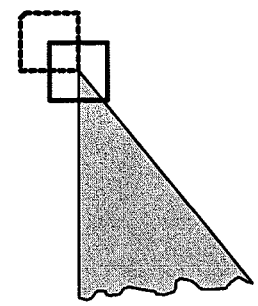
FIG. 12C FIG. 16A
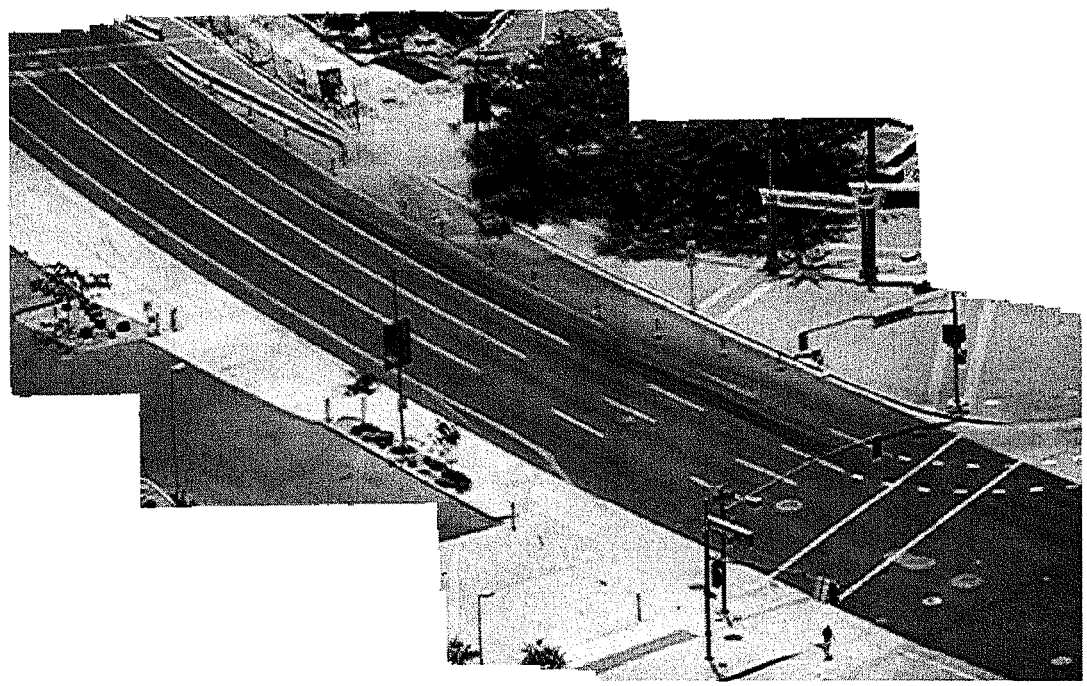
FIG. 16B

METHODS FOR MULTI-POINT DESCRIPTORS FOR IMAGE REGISTRATIONS

This application claims priority to provisional patent application Ser. No. 60/784,495 filed Mar. 20, 2006. The entire text of each of the above-referenced disclosure, including figures, is specifically incorporated by reference herein without disclaimer.

BACKGROUND OF THE INVENTION

1. Field of the Invention

The present invention relates generally to image processing. More particularly, the present disclosure relates to methods for generating an image mosaic from disparate images.

2. Description of Related Art

Image mosaicking, a process that combines 2 or more images into a panoramic mosaic is generally needed because a field of view of a camera is limited. Generally, larger objects cannot be captured into a single image and therefore, the ability to "stitch" a number of images together can provide a more complete image.

Some mosaics, such as mosaics from satellite images, are created from a set of images whose mutual displacements are pure image-plane translations. Other methods include rotating a camera around its optical center using a special device, and creating a panoramic image which represents the projection of the scene onto a circle or a sphere. Since it is not simple to ensure a pure rotation around an optical center, the resultant mosaics can be used only in limited cases.

While conventional image techniques provide some advantages, they suffer from many problems. For example, current digital processing lacks accurate alignment for two or more images. Generally, the algorithm looks for an overlapping region conveyed in at least two images and uses a basic "cut and paste" technique to stitch the images together. However, this technique fails to overcome intensity differences between images and therefore, a seamless image can not be created.

The referenced shortcomings are not intended to be exhaustive, but rather are among many that tend to impair the effectiveness of previously known techniques for generating an image mosaic; however, those mentioned here are sufficient to demonstrate that the methodologies appearing in the art have not been altogether satisfactory and that a significant need exists for the techniques described and claimed in this disclosure.

SUMMARY OF THE INVENTION

The present disclosure provides systems and techniques for mosaicking or "piecing" together frames taken by a camera to form, for example, a single, panoramic image in real-time or substantially real-time.

In one respect, a method for image mosaicking is provided. The method may include the steps for determining pixels saliency of a first image and second image, where the second image may be similar to the first image. A salient pixel may be selected from the determined pixels saliency of the first image. Similarly, one salient pixel from the determined pixels saliency of the second image may also be selected. The first and second image may be mosaic together if the selected salient pixels from the first and second images are successfully registered.

In other respects, a method for generating an image mosaic is provided. Steps of the method include providing at least a first and second image. A target similar in both the first and second image may be selected. A salient pixel from each of the provided images is selected, where the salient pixels relate to the selected target. The salient pixels may be registered and upon successful registering, the image mosaic may be generated.

In some respects, a method for image mosaicking determines pixels saliency of a first image and second image. One salient pixel may be selected from the determined pixels saliency from each of the first and second image. If the selected salient pixels are successfully registered, the first and second images, the mosaicking step may be performed.

The term "image mosaicking" as used and define in this disclosure refers to a technique for mapping of an image series onto a common image grid. The result of the mosaic may form a comprehensive view of a scene (i.e., an image formed from the image series).

The terms "a" and "an" are defined as one or more unless this disclosure explicitly requires otherwise.

The term "substantially," "about," and its variations are defined as being largely but not necessarily wholly what is specified as understood by one of ordinary skill in the art, and in one-non-limiting embodiment, substantially and its variations refer to ranges within 10%, preferably within 5%, more preferably within 1%, and most preferably within 0.5% of what is specified.

The term "coupled" is defined as connected, although not necessarily directly, and not necessarily mechanically.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 4 shows a program for finding connection points, in accordance with embodiments of the disclosure.

FIGS. 10A and 10B show an example of image mosaicking, in accordance with embodiments of the disclosure.

FIGS. 12A, 12B, and 12C each show a position of a pixel, in accordance with embodiments of the disclosure.

FIGS. 16A and 16B show a video sequence with a moving vehicle and a mosaic of the video sequence, respectively, in accordance with embodiments of the disclosure.

DESCRIPTION OF THE ILLUSTRATIVE EMBODIMENTS

Figure 1:
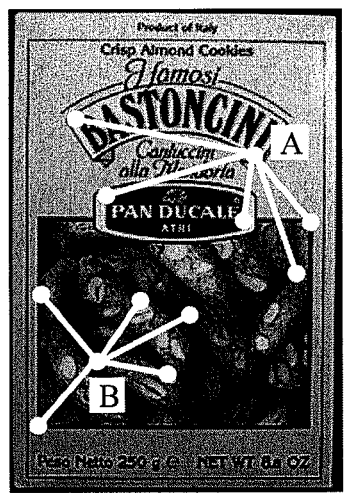
FIG. 1 shows a multi-point descriptor selected from an, in accordance with embodiments of the disclosure.

The disclosure and the various features and advantageous details are explained more fully with reference to the non-limiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

The present disclosure provides a real-time or substantially real-time image mosaicking system operable in real-world conditions. The techniques of the present disclosure accounts for certain aspects related to an image capture including, but not limited to camera motion, disturbances from moving objects and annotations, luminance variance, and other noise inducing conditions. The algorithm of the present disclosure may use with automatic corner detection to find critical points within an image, the critical points may be used to represent the image. Numerical techniques may be used to distinguish between the critical points belonging to an image as compared to those resulting from a disturbance and/or movement of a camera. An affine model (described below) may be used to describe the frame-to-frame differences that result from camera motion. A local adaptive fine-tuning step may be used to correct an approximation error due to the use of the affine model and may also be used to compensate any luminance variance. The mosaic may be constructed progressively as new images are added.

In many computer vision applications for applications such as, but not limited to target recognition, video compression, target tracking, correction of lens distortion, and the like, a correspondence between images may be determined. In one respect, one or more points of interests are identified in the image frames under consideration. Next, descriptors (also referred to as "point descriptors") may be obtained from the surrounding areas of the points of interests to reflect their optical and geometric properties. With this information, points of interests in different image frames may be matched by inspecting their corresponding descriptors.

In one respect, the point descriptors of the present disclosure are desired to be distinctive, i.e., as different as possible for different points of interests, and/or stable, i.e., the descriptor maintains a similarity for the same points of interest when the image undergoes transformation. Point descriptors may refer for example, to a shape context, a steerable filter, scale-invariant feature transform (SIFT), principal component analysis SIFT (PCA-SIFT), differential invariants, spin images, complex filters, moment invariants, and more. These point descriptors may be obtained by taking into calculation a region surrounding a single point of interest. A pair of descriptors may be used to match a single pair of points, i.e., a point at an image frame that may be matched to a point in another frame. In one respect, to make the point descriptors stable under image transformations, an affine-invariant region detection and normalization may be applied prior to the calculation of the point descriptors.

Some descriptors, which may be defined directly on multiple points, have been developed. For example, an intensity profile may be used as point descriptors. Referring to FIG. 1, a set of points of interests is chosen (point "A" or point "B"), each of which may be subsequently processed. A given point descriptor may be connected to another point descriptor if the two are within a certain distance range. Along the line determined by two connected point descriptors, a pixel intensity profile may be calculated. Using a fast Fourier transform (FFT) may be applied to transform the pixel intensity into a frequency domain, and the FFT coefficients for a line form a feature vector. A point descriptor for a point of interest may include all the feature vectors common to this point under consideration. Even though current descriptors may provide some benefits, however, little has been done to systematically evaluate the performance of this type of point descriptors.

Due to the importance of point descriptors in image registration, it is desirable to develop and evaluate pint descriptors defined on multiple points of interests, and use these multi-point descriptors to match multiple pairs of points simultaneously. In this disclosure, a descriptor defined on a single point is a single-point descriptor (SPD), while a descriptor defined on multiple points is a multi-point descriptor (MPD). The word "descriptor" and "point descriptor" and their respective plural form may be used interchangeably in this disclosure. The words "point," "interest point," and "point of interest" and their respective plural for may also be used interchangeable throughout the disclosure.

In one respect, MPDs may be constructed using two different approaches. The first may involve a simple concatenation of SPDs. For example, concatenation of SPDs for two interest points makes a 2-point SPD, while that of three points makes a 3-point SPD and so on.

The second approach may be based on the intensity profile of a line connecting two points, which the inventors coined as an EDGE or a 2-point EDGE. Different from the first method, a 3-point EDGE may be the concatenation of three 2-point EDGEs, each of which may be determined by two of the three points.

Figures 2A, 2B, 2C:
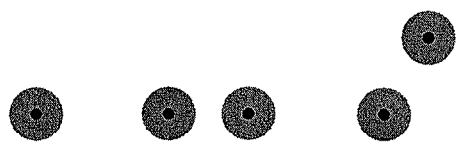
FIGS. 2A through 2E show various types of descriptors, in accordance with embodiments of the disclosure.
Figures 2D, 2E:
Figure 3A:
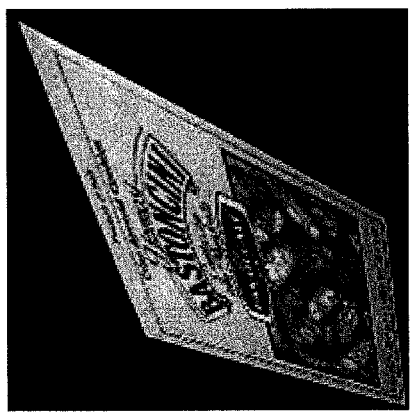
FIGS. 3A through 3D show selecting a descriptor (FIG. 3A) from an image, an image generated from the one shown in FIG. 3A (FIG. 3B), and 3-point EDGEs for FIGS. 3A and 3B (FIGS. 3C and 3D, respectively), in accordance with embodiments of the disclosure.
Figure 3B:
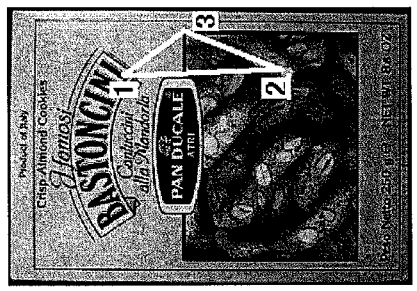
Figure 3C:
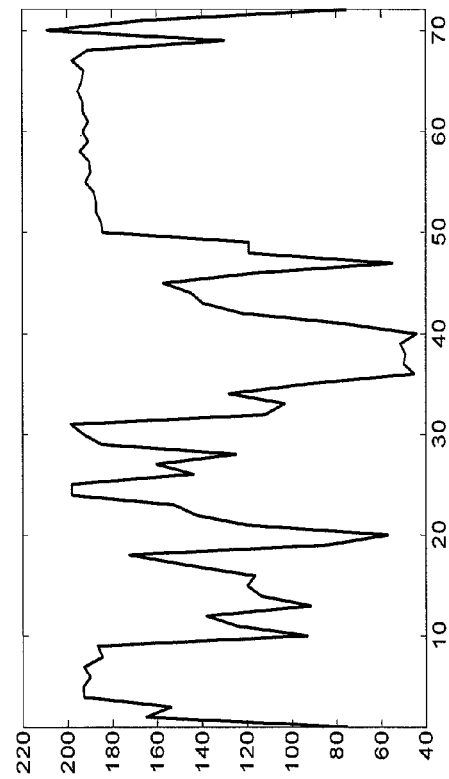
Figure 3D:
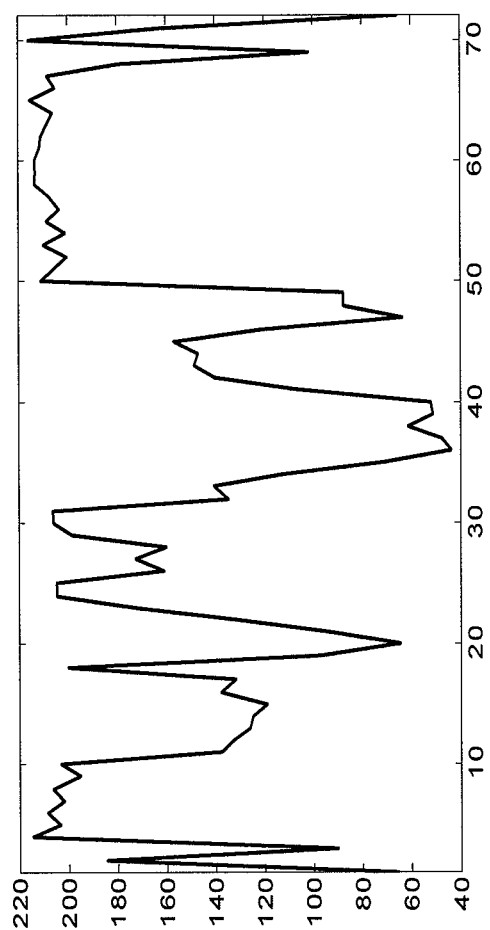

Referring to FIGS. 2A and 2E, an illustration of the second approach is shown. Three interest points, which are marked as "1," "2," and "3" in FIG. 3A determine a triangle. The intensity profile along the triangle is a 3-point EDGE, and is depicted by the curve in FIG. 3C. FIG. 3B is a distortion of FIG. 3A. The 3-point EDGE determined by the same points in FIG. 3B is shown in FIG. 3D. It can be seen that the 3-point EDGE has little change although the image may be distorted.

Techniques of the present disclosure may be carried using SIFT, multi-point SIFT, and/or multi-point EDGE. The descriptors may be evaluated in terms of, for example, stability, distinction and recall precision. For example, the more points used, the descriptors may be more stable and distinctive. In another non-limiting example, the descriptors may exhibit different property in terms of recall precision rate. A 1-point SIFT may be better than 2 or 3-point SIFT, while 3-point EDGE may be better than a 2-point EDGE. A 3-point EDGE may be better than a 1-point SIFT and may be capable to match multiple pair of points simultaneously. The various techniques described here may depend on design parameters, and one of ordinary skill in the art would recognize that the advantages of using a SIFT, multi-point SIFT, or a multi-point EDGE may vary based on, for example, those design parameters.

Point of Interest and Affine-Invariant Region

Point descriptors may be defined based on, for example, points of interest. In one respect, there are three main approaches to detecting points of interest: contour based, parametric based, and intensity based. The most popular methods are the intensity based.

In one respect, detection of the points of interests may be done using Harris' algorithm, which may determine whether a pixel is in the interior, on the edge, or at a corner of an object by measuring the image around the pixel along different directions. Let P be the pixel being considered. The location of P may determined by moving a window around P and measuring the change of the image within the window. When P is in the interior of a target, moving the window along any direction may result in little or no change. When P is on an edge, moving the window in a perpendicular direction may result in a large change, while moving the window along the edge may result in little or no change. When P is at a corner, the change may be significant in any direction.

Figure 5A:
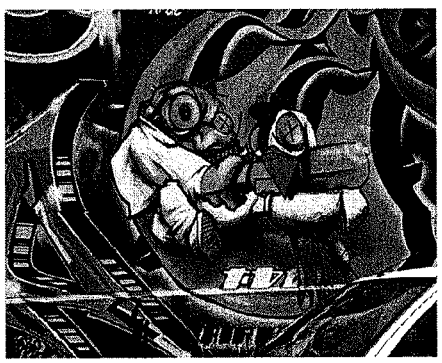
FIGS. 5A through 5H show a testing image with selected interest points, in accordance with embodiments of the disclosure.
Figure 5B:
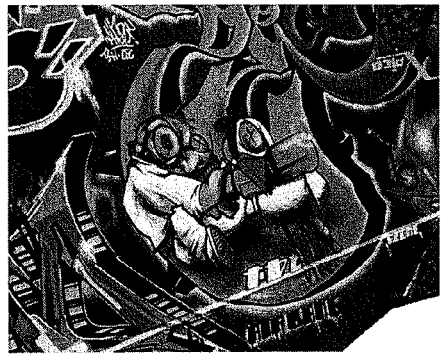
Figure 5C:
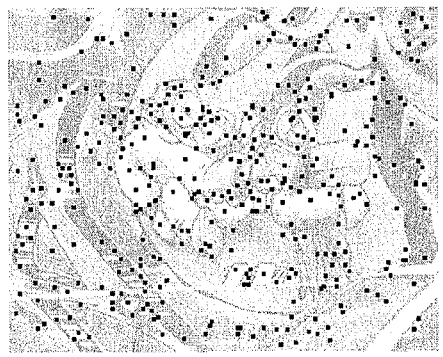
Figure 5D:
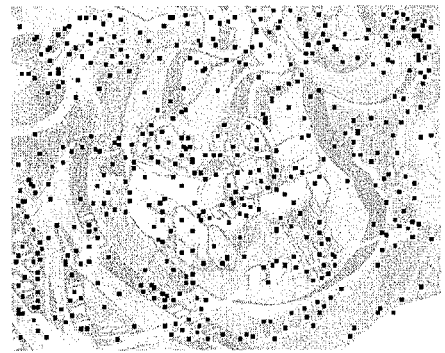
Figure 5E:
Figure 5F:

By detecting changes, the probability of being a corner for every pixel may be calculated. Points of interest may be chosen from those with local maximal and large probabilities. These points are sometimes called Harris' corners, some examples of which are shown in FIGS. 5E and 5F.

In one respect, to obtain a set of distributed points of interest that uniformly cover an image under consideration, a neighborhood depression technique may be employed. Let the number of expected points be K and let the size of the image be W×H. First, pixels with higher probabilities of being corners may be identified. Next, pixels may be sorted according to their corresponding probabilities in a descending order. The technique may be iteratively performed with the following procedure until K points are found or the sorting list is empty. First a pixel associated with the highest probability of being a corner as a point of interest may be chosen. The location of the chosen pixel may be labeled as (x, y). Next, all pixels within $\{x \pm d_x, y \pm d_y\}$ on the sorted list may be removed. The values for $d_x$ and $d_y$ may be determined as follows:

$$d_x = W/(2\sqrt{2K})$$

$$d_y = H/(2\sqrt{2K}) \qquad \text{Eq. 1.}$$

Figure 5G:
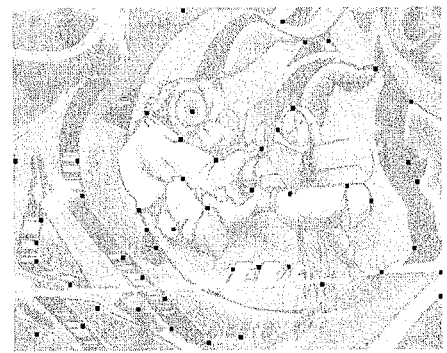
Figure 5H:
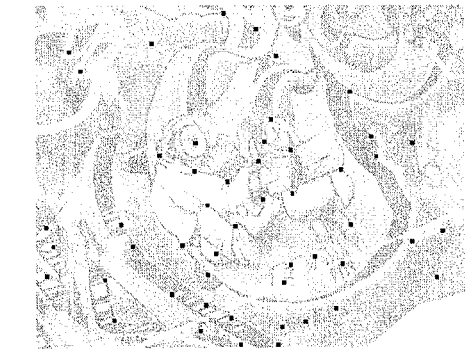

Some examples of the chosen points by the Harris' algorithm with neighborhood depression are shown in FIGS. 5G and 5H. Once the points of interest are selected, the descriptors may be calculated using pixels within an area of a predefined size surrounding the point. It is noted that the descriptors may be distorted due to the inclusion of different image content in the predefined area when the image undergoes transformation.

Affine-Invariant Region Detection

Recently, many algorithms have been developed focusing on finding image regions that are invariant to image transformations. Such algorithms are referred to as "affine-invariant region detectors." The detected regions may be normalized to a predefined size and orientation prior to the calculation of the descriptors. Therefore, the descriptors may be more stable under image transformations, compared to the descriptors calculated from regions of a fixed size. The point detectors may exhibit different characteristics and may be more adapted to structured scenes while others to textures.

A region may be detected using a SIFT algorithm on the image scale space. An image scale space may be generated by smoothing the image in increasing degrees. In one respect, let the image be I(x, y). The smoothed image is the convolution of I(x, y) with a Gaussian filter G(x, y, σ) as follows $$L(x,y,\sigma) = G(x,y,\sigma) * I(x,y) \qquad \text{Eq. 2.}$$

As the scale increases, smaller regions may become merged into larger ones. At the location and scale of merging, values of the function L(x, y, σ) exhibits large changes. On the other hand, by detecting changes in L(x, y, σ), the location and size of the region can be determined. The detected regions are referred to as SIFT regions in this disclosure.

Multi-Point Descriptors

A pair of SPDs may be used to match a pair of points. Alternatively, MPDs may be used to match multiple pairs of points. In one respect, MPDs may be developed using two approaches. In the first approach, an MPD may be configured as a concatenation of some SPDs. As shown in FIGS. 2B and 2C, the SPDs for two or three points may be concatenated to form 2-point or 3-point descriptors, respectively.

The second approach is EDGE technique. An EDGE may be related to a pixel intensity profile of those pixels along a line between two points of interest. The EDGE may be a 2-point descriptor and may also be referred to as a 2-point EDGE. On the other hand, a 3-point EDGE may be the concatenation of three 2-point EDGEs, each of which may be determined by two of the three points. Examples of 2-point and 3-point EDGEs are shown in FIGS. 2D and 2E.

To compute a 2-point EDGE, let the two interest points be at $(x_s, y_s)$ and $(x_e, y_e)$, and let the length of an EDGE be M. The line connecting $(x_s, y_s)$ and $(x_e, y_e)$ may be uniformly sampled by M. Let the sampling locations be $(x_i, y_i)$, $1 \leq i \leq M$ and let function $\lfloor x_i \rfloor$ be the largest integer smaller than or equal to $x_i$, the $i^{th}$ element of the EDGE may be determined by:

$$F_i = I(\lfloor x_i \rfloor, \lfloor y_i \rfloor) \times (\lfloor x_i \rfloor + 1 - x_i) \times (\lfloor y_i \rfloor + 1 - y_i) + \qquad \text{Eq. 3}$$
$$I(\lfloor x_i \rfloor, \lfloor y_i \rfloor + 1) \times (\lfloor x_i \rfloor + 1 - x_i) \times (y_i - \lfloor y_i \rfloor) +$$
$$I(\lfloor x_i \rfloor + 1, \lfloor y_i \rfloor) \times (x_i - \lfloor x_i \rfloor) \times (\lfloor y_i \rfloor + 1 - y_i) +$$
$$I(\lfloor x_i \rfloor + 1, \lfloor y_i \rfloor + 1) \times (x_i - \lfloor x_i \rfloor) \times (y_i - \lfloor y_i \rfloor).$$

F, a column vector of size N, may be a 2-point or 3-point EDGE, and may be normalized as follows, $$\hat{F} = (F - \bar{F}) \Big/ \sqrt{\sum_{i=1}^{N} (F_i - \bar{F})^2} \qquad \text{Eq. 4}$$

where $\bar{F}$ is the average of the elements of F. After the normalization described in Eq. 4, the EDGE may be invariant to luminance, assuming luminance changes linearly.

MPDs may be more accurate than SPDs since they are defined on more points. For example, consider the following scenario in the first approach for generating MPDs. Let the SPDs be independent and let the mismatching probability of a SPD be p. Then the mismatching probability for an MPD made by a concatenation of two SPDs is $p^2 < p$.

In the second approach for generating MPDs, a pixel intensity profile along a line connecting two points on a planar surface may be invariant to affine transformation. On the other hand, SPDs rely on the "affine invariant region detectors" for the transformation invariance. However, the "affine-invariant region detectors" are not always accurate and most of them may only detect regions invariant to translation, rotation, and uniform scaling instead of other transformations included in the affine model.

However, there are some issues associated with the MPD, too. For example, the number of MPD is more than that of SPD. To illustrate, let the number of interest point be n. Then there are n single-point descriptors but (n(n−1)) 2-point descriptors. The other problem is uniquely for EDGE: The affine-invariance of the pixel intensity profile is only valid for points on a planar surface, while two arbitrary points do not always satisfy this condition.

These issues can be partially circumvented by only using points in close proximity when calculating an MPD. To illustrate, consider a point connected to its 10 nearest neighbors. Then the number of 2-point descriptors is 10n, where n denotes the number of interest point. Furthermore, these points may more likely be from the same target and from a planar surface. A point selection procedure for the MPDs is summarized as follows.

Let $P_1, P_2, \ldots, P_K$ be the chosen points of interest in an image. Each of these points is connected to its nearest neighbors. Based on the connected points, 2-point descriptors can be calculated.

The calculation for 3-point descriptors may be more complex, since any two of the three points must be connected. Let matrix $[e_{ij}]$ be the indicators of the connectivity among points, i.e., $e_{ij}=1$ if the ith point is connected to the $j^{th}$ point and 0 otherwise. Initialize $[B_{ijk}]$ by zeros, $B_{ijk}$ is a 3D matrix. $B_{ijk}=1$ if the $i^{th}$, $j^{th}$, and $k^{th}$ interest points are selected to form a 3-point descriptor and 0 otherwise. The procedure for finding three sets of connecting points is listed in FIG. 3.

Transformations from image $I_1$ to image $I_2$ may be considered using a projective model $[a_{ij}]$. A point at $(x_i, y_i)$ in $I_1$ may be transformed to a point at $(x_t, y_t)$ using the following model:

$$x_t = \frac{a_{11}x_1 + a_{12}y_1 + a_{13}}{a_{31}x_1 + a_{32}y_1 + a_{33}} \qquad \text{Eq. 5}$$
$$y_t = \frac{a_{21}x_1 + a_{22}y_1 + a_{23}}{a_{31}x_1 + a_{32}y_1 + a_{33}}.$$

Correspondence Between Two Points of Interest

In some respects, Eq. 5 may not satisfy two points corresponding to the same target point due to, for example, quantization errors in digital images. Therefore, a correspondence between two points of interests may need to be determined.

Let $(x_t, y_t)$ be the transformed coordinates of an interest point at $(x_1, y_1)$ in $I_1$ according to Eq. 5. If there exists an interest point at $(x_2, y_2)$ such that the distance between $(x_t, y_t)$ and $(x_2, y_2)$ is no greater than some number of pixels (e.g., $\sqrt{2}$ pixels), then $(x_i, y_i)$ and $(x_2, y_2)$ correspond to each other. Note that $\sqrt{2}$ pixels may be used as the distance threshold because it is the maximum distance two connecting pixels can have, if 8-connectness is adopted. Other distances may be used.

Once the similarity between every interest point in I1 and that in I2 is calculated, a number of $N_2$ ($N_2 \leq N_1$) pairs of the most similar interest points may be located. Based on these $N_2$ pairs of interest points, the projective transform coefficients $[a_{ij}]$ may be obtained.

To register a pair of images, a certain number of corresponding interest points may need to be determined. For example, at least 4 pairs of corresponding interest points may be necessary if projective transform as shown in Eq. 5 is used. To ensure a sufficient number of corresponding points generated, more interest points may need to determined when the images, for example, in images that are more disparate. On the other hand, fewer interest points are preferred for computation efficiency.

The proposed dynamic point selection procedure automatically increases the number of interest point, $N_1$, when the selected interest points may not have enough corresponding ones. In one respect, estimated projective model may be applied on some or all of the $N_1$ interest points. If $N_3$ ($N_2 \leq N_3 \leq N_1$) pairs of corresponding points are found, and the descriptors for these interest points are similar, then the projective model $[a_{ij}]$ may be validated. Otherwise, $N_1$ may be increased and the aforementioned procedure is reiterated.

If the selected interest points consist of more than enough corresponding ones, fewer interest points may be chosen for the next pair of images. In other words, if the previous $N_4$ or more pairs of images have been successfully registered without increasing $N_1$, then $N_1$ may be reduced.

Typical settings for $N_2$, $N_3$, and $N_4$ may be 6, 12, and 4, respectively, although the numbers may vary as described above. In some respects, $N_1$ may be initialized to some predetermined number such as 50, and $N_1$ may be increased incrementally for a failure of point registration, or reduced incrementally each time $N_4$ or more successive pairs of images have been registered without increasing $N_1$. The incremental step for the increasing or reduction of $N_1$ may vary and any step size may be used.

Correspondence of Two Descriptors

Two descriptors may correspond to each other if the interest points from which the descriptors are defined correspond to each other in order. For example, let $\hat{F}_1$ be an MPD in $I_1$ determined by interest points $P_{1a}$ and $P_{1b}$, while $\hat{F}_2$ be an MPD in $I_2$ determined by interest points $P_{2a}$ and $P_{2b}$. $\hat{F}_1$ and $\hat{F}_2$ correspond to each other if and only if $P_{1a}$ corresponds to $P_{2a}$ and $P_{1b}$ corresponds to $P_{2b}$, respectively.

The similarity between two descriptors may be measured by their inner product, i.e., $$S(\hat{F}_1, \hat{F}_2) = \hat{F}_1^T \hat{F}_2 \quad \text{Eq. 6}$$

Match of Two Descriptors

Two descriptors $\hat{F}_1$ and $\hat{F}_2$ may match each other if their similarity is greater than or equal to a threshold $T_m$. There are several methods to examine descriptor performances. The first may be done by examining the probability distribution of measured similarities, which can be approximated by the histogram. The less the variance of the similarity for corresponding or non-corresponding descriptors, the more stable the descriptors are; the more different the similarity for corresponding and non-corresponding points, the more distinctive the descriptors are. To be exact, let and $\mu_c$ and $\sigma_c$ be the mean and standard deviation of the corresponding descriptors, respectively, and let $\mu_n$ and $\sigma_n$ and be those for non-corresponding descriptors. The smaller the $\sigma_c$ and $\sigma_n$ is, the more stable the descriptors are. The larger the value of $$\eta = \frac{|\mu c - \mu n|}{\sqrt{\sigma_c \sigma_n}}$$

the more distinctive the descriptors are. Therefore, the separability measure may be performed as follows, $$\eta = \frac{|\mu c - \mu n|}{\sqrt{\sigma_c \sigma_n}}. \quad \text{Eq. 7}$$

Alternatively, the separability may be use a receiver operating curve (ROC) or recall precision curve. The recall and precision may be defined in the following equations.

$$\text{recall} = \frac{\text{number of match}}{\text{number of correspondance}} \quad \text{Eq. 8}$$

$$1-\text{precision} = \frac{\text{number of false match}}{\text{number of match}} \quad \text{Eq. 9}$$

By reducing $T_m$ more matches, including correct matches and false matches, may be found.

Simulations

The present disclosure includes SIFT, 2-point SIFT, 3-point SIFT, EDGE and 3-point EDGE methods for a comparison of various point descriptors. A (1-point) SIFT may include 128 elements and may be calculated by a binary as described in *Object Recognition from Local Scale-Invariant Features* by Lowe, incorporated herein by reference in its entirety. Let $F_1$, a column vector of size N, be a 1-point or multi-point SIFT descriptor. F may be normalized as follows $$\hat{F} = F / \sqrt{\sum_{i=1}^{N} F_i^2}. \quad \text{Eq. 10}$$

An (2-point) EDGE may be calculated according the procedure described above (e.g., Eq. 3). It may include 12 elements unless otherwise specified. The EDGEs may be calculated on both the SIFT regions and Harris' corners, while SIFTs may be calculated on the SIFT regions, where the SIFTs may be defined on the affine-invariant regions.

The first part of the experiments are carried out on synthetic images. The objective is to evaluate stability of the descriptors when images are subject to transformations. The prototype image is shown in FIG. 3A. The prototype image may be deformed by a random projective model together with luminance change and noise addition. Approximately 1000 images are synthesized, one of which is shown in FIG. 3B. Three interest points, representing the three most frequently identified by the SIFT region detector, are shown in FIG. 3A. The locations of these three points on the synthetic images may be calculated by the projective model. The descriptors may then be calculated on each of the images by the procedure described above. The result of SIFT is shown in Table 1 and that of EDGE is shown in Table 2. From these tables, it can be seen that as more points are used to determine the descriptors, the deviation of the similarity is reduced and hence the separability is improved. By comparing the tables, it can also be seen that EDGE is more stable than SIFT under image transformations.

TABLE 1

Mean (μ) and standard deviation (σ) of similarity for SIFT

| | Point No. | Descriptor 1 | Descriptor 2 | Descriptor 3 | Mean |
|---|---|---|---|---|---|
| μ | 1 | 0.8550 | 0.8374 | 0.7246 | 0.8057 |
| | 2 | 0.8462 | 0.7810 | 0.7898 | 0.8057 |
| | 3 | | 0.8057 | | |
| σ | 1 | 0.1993 | 0.1864 | 0.2337 | 0.2065 |
| | 2 | 0.1590 | 0.1718 | 0.1501 | 0.1603 |
| | 3 | | 0.1416 | | |

TABLE 2

Mean (μ) and standard deviation (σ) of similarity for EDGE

| | Length | 2-PT 1 | 2-PT 2 | 2-PT 3 | 2-PT | 3-PT |
|---|---|---|---|---|---|---|
| μ | 6 | 0.9626 | 0.9920 | 0.9716 | 0.9754 | 0.9753 |
| | 12 | 0.9792 | 0.9880 | 0.9732 | 0.9802 | 0.9811 |
| | 24 | 0.9680 | 0.9750 | 0.9688 | 0.9688 | 0.9710 |
| σ | 6 | 0.0262 | 0.0068 | 0.0217 | 0.0182 | 0.0163 |
| | 12 | 0.0211 | 0.0088 | 0.0237 | 0.0179 | 0.0152 |
| | 24 | 0.0199 | 0.0097 | 0.0224 | 0.0174 | 0.0143 |

The following focuses on evaluating both the distinction and stability of the descriptors. These experiments are carried out on the database known in the art. The database includes transformation parameters among images, in addition to the imagery data. Most of the results shown in the following are for the images in FIGS. 5A and 5B. The original image size is 800×640.

Figure 6A:
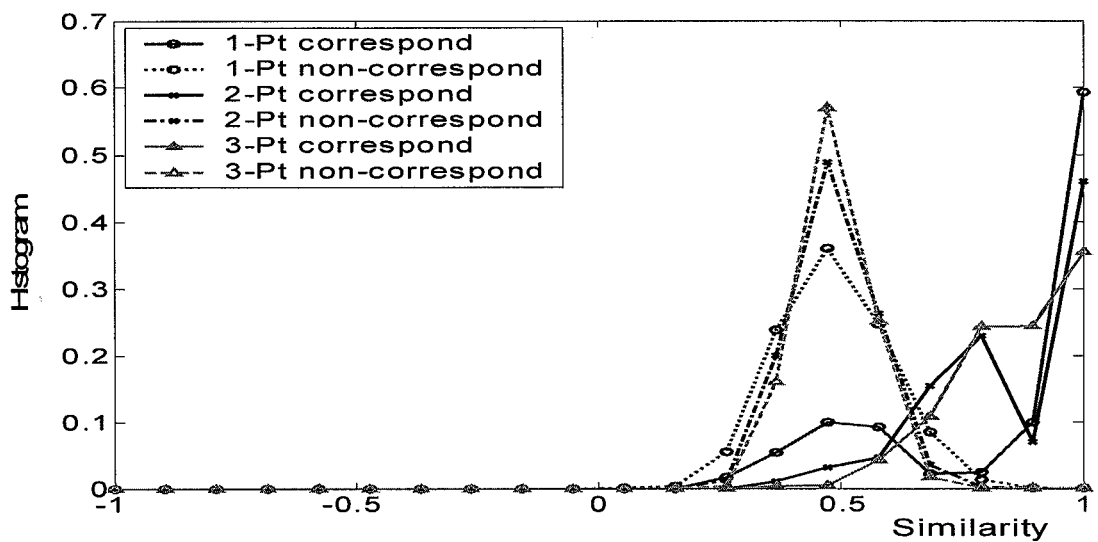
FIGS. 6A and 6B show performance of a SIFT, in accordance with embodiments of the disclosure.
Figure 6B:
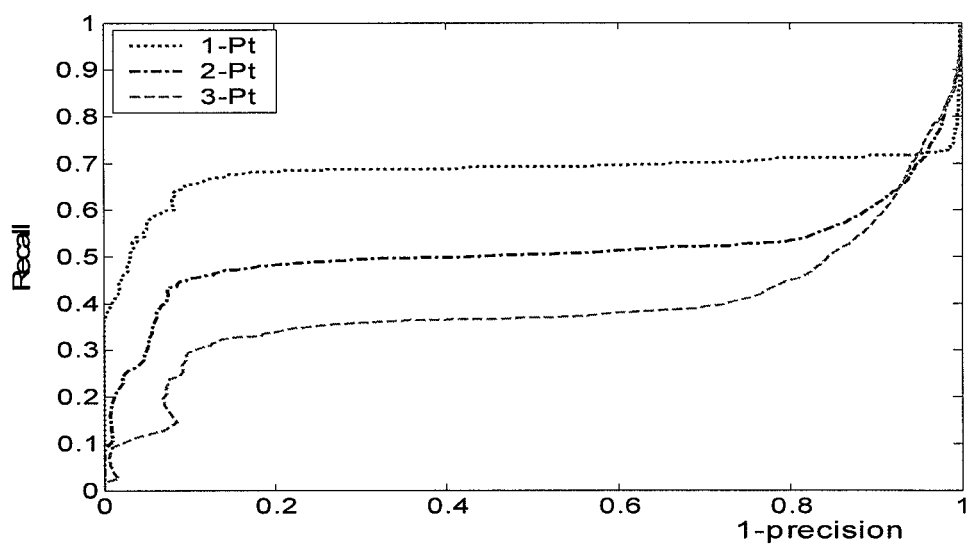

When a moderate number of descriptors is used, images are down-sampled by 4 prior to SIFT region detection. Approximately 500 points may be detected from each of the images. These points are shown in FIGS. 5c and 5D. Each of these points may be coupled to its 10 nearest neighbors. The results are shown in Table 3 and FIGS. 6A and 6B. SIFT descriptors calculated on the SIFT regions are labeled "SIFT." EDGE calculated on the SIFT region is labeled "EDGE-SIFT." EDGE may be calculated on the Harris corners without neighborhood depression is labeled "EDGE-Harris", and EDGE calculated on the Harris corners on the Harris corners with neighborhood depression is labeled "EDGE-Harris depress." From Table 3, it can be seen that as more points are used, the deviation of either corresponding or non-corresponding points is reduced. Hence the separability is improved. This can also be seen from FIG. 6A because as more points are used, the histograms become more compact. However, FIG. 6B reveals that the more points used, the worse of the recall precision rate. This can be explained from Table 3 because as more points are used, the number of non-corresponding descriptors increases with a speed much faster than that of the corresponding ones. Hence, there is a trade-off between stability and false matching.

TABLE 3

Performance of some descriptors

| Descriptors | | # Correspond | # Non-Correspond | $\|\mu_c - \mu_n\|$ | $\sigma_c$ | $\sigma_n$ | $\eta$ |
|---|---|---|---|---|---|---|---|
| SIFT | 1-Pt | 371 | 273127 | 0.35 | 0.22 | 0.11 | 2.28 |
| ≈500 regions | 2-Pt | 1696 | 19106726 | 0.35 | 0.15 | 0.08 | 3.28 |
| | 3-Pt | 2301 | 224045007 | 0.36 | 0.12 | 0.06 | 4.15 |
| EDGE-SIFT ≈500 regions | 2-Pt | 1696 | 19106726 | 0.92 | 0.22 | 0.56 | 2.66 |
| | 3-Pt | 2301 | 224045007 | 0.96 | 0.11 | 0.41 | 4.47 |
| EDGE-Harris 100 points | 2-Pt | 365 | 835499 | 0.82 | 0.31 | 0.42 | 2.27 |
| | 3-Pt | 771 | 21806049 | 0.86 | 0.18 | 0.28 | 3.78 |
| EDGE-Harris depress 25 points | 2-Pt | 52 | 49556 | 0.81 | 0.05 | 0.32 | 6.53 |
| | 3-Pt | 80 | 1214770 | 0.83 | 0.02 | 0.31 | 11.91 |

Figure 7A:
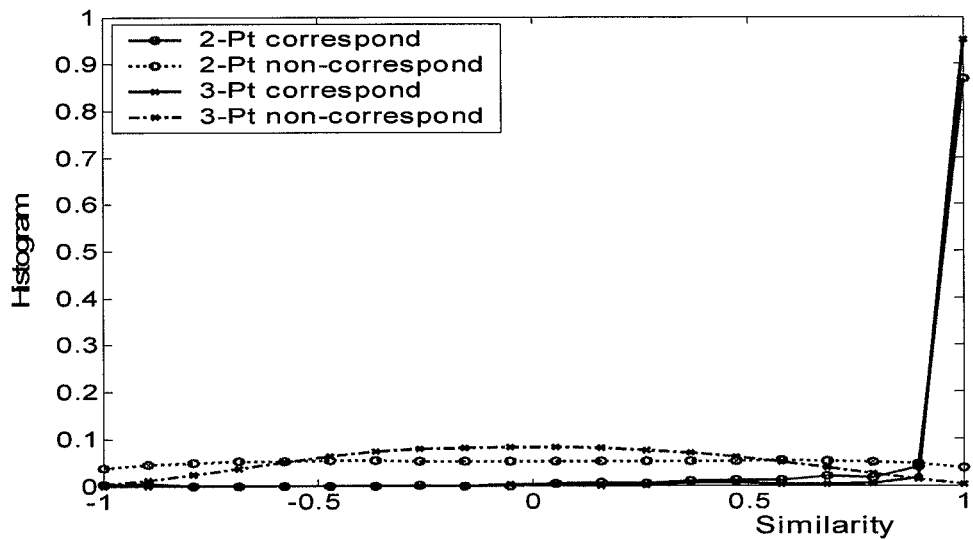
FIGS. 7A and 7B show performance of EDGE calculations on SIFT regions, in accordance with embodiments of the disclosure.
Figure 7B:
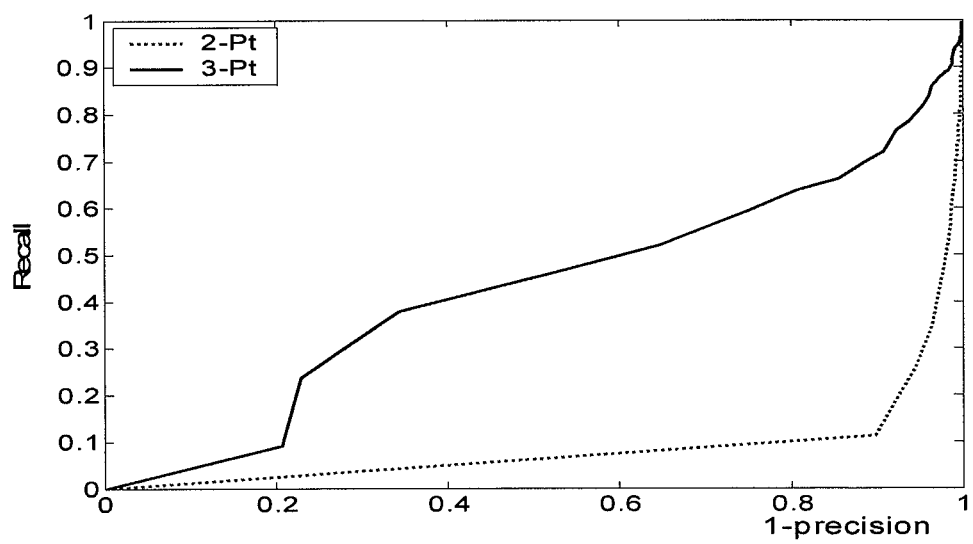

EDGEs may be calculated on the points shown in FIGS. 5C and 5D. The results are shown in FIGS. 7A and 7B and Table 3. FIG. 7A it can be seen that the similarity histogram of non-corresponding points may be flat while that of corresponding points may be compact. It can also be seen that when more points are used, both histograms become more compact. Referring to FIGS. 7A and 7B, even when the number of non-corresponding points increases rapidly, the recall precision rate of 3-point EDGE may be better than that of 2-point EDGE, although the 2-point EDGE may provide many advantageous.

Figure 8A:
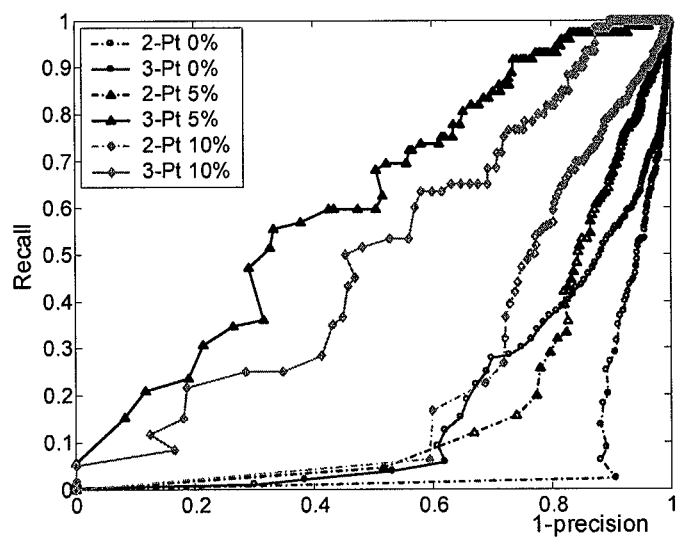
FIGS. 8A and 8B show precision curves of EDGE calculated on Harris' corners, in accordance with embodiments of the disclosure.

Although EDGE has shown to be stable under transformations, its recall precision rates are low, as shown in FIGS. 7A and 7B. This may be due to that the SIFT regions do not fit for EDGE, or pairs of points chosen for calculating EDGE do not fit for EDGE. To further investigate these issues, Harris' algorithm may be used to select points. FIGS. 5E and 5F show 100 points that most probable to be corners. The pairs selected for calculating EDGE may be chosen to be the closest ones, or the points which are far from each other given a threshold on distance. In one respect, a point is connected to one of its 10 nearest neighbor; (2) 10 nearest neighbors which are far from this point for more than 5% of the image size (minimum of width and height); (3) 10 nearest neighbors which are far from this point for 10% of the image size. The results are shown in FIG. 8A. From this figure, it can be seen that choosing pairs which are farther apart does improve the performance.

Figure 8B:
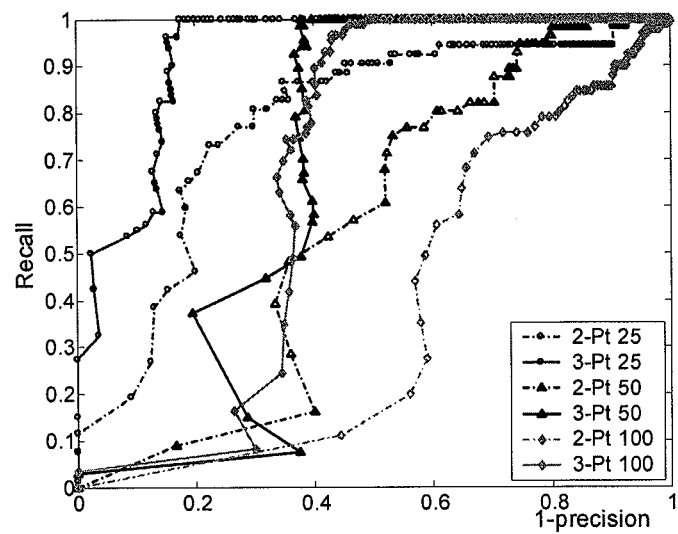

FIGS. 5E and 5F show that the points selected by Harris' algorithm may concentrate on a small region of the images. To evaluate whether making the points uniformly distributed over an image improves performance, the neighborhood depression method for choosing points as described above. 25, 50, or 100 points may be chosen from each image and each point may be connected to its 10 nearest neighbors. FIGS. 5G and 5H show the 50 points selected using this method. The result is shown in 8B. From this figure, it can be seen that a properly selected number of points may improve the overall performance. By comparing FIGS. 6A, 6B, 7A, 7B with FIGS. 8A and 8B, it can be seen that by only choosing 25 points, 3-point EDGE may provide advantages.

Figure 9A:
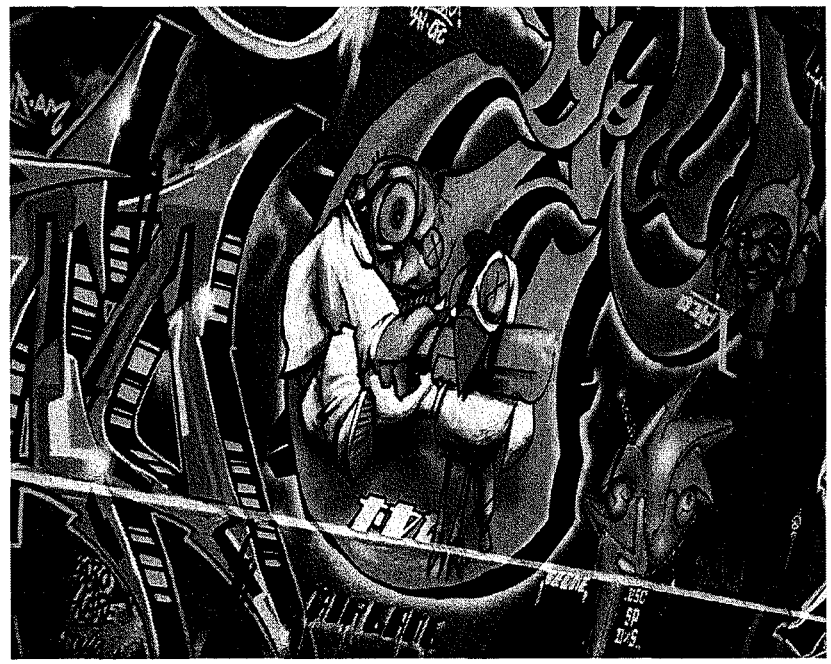
FIGS. 9A and 9B show a testing image and a recall precision curve for the testing image, respectively, in accordance with embodiments of the disclosure.

The experiments also include other images in the database with different numbers of neighbors. These experiments reveal similar results. As an example, FIG. 9A shows another testing image and the corresponding results.

Figure 9B:
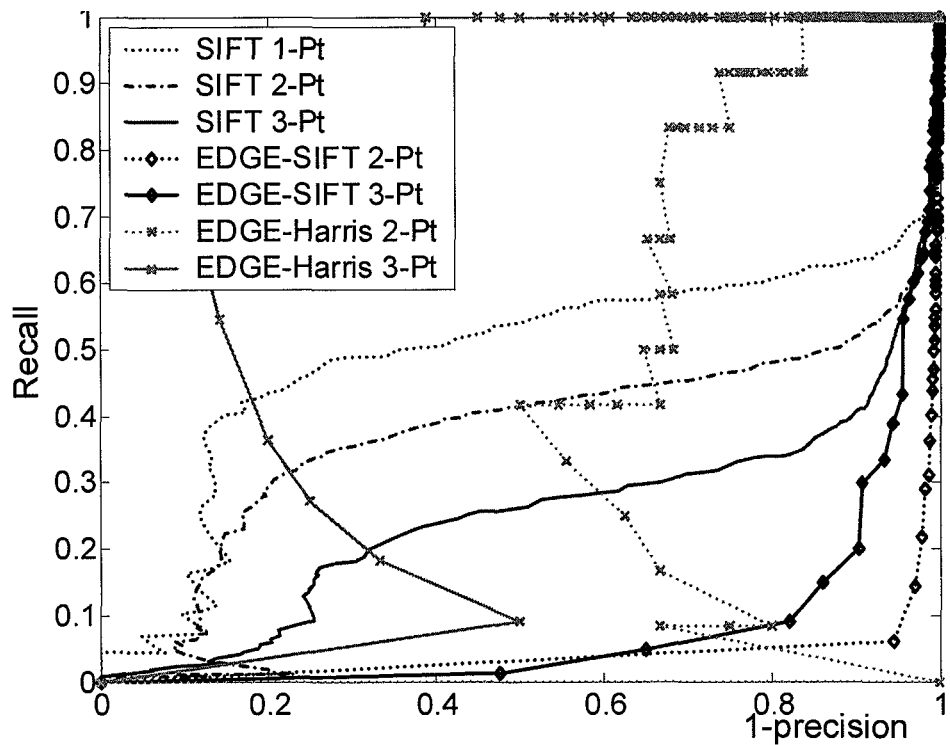

In some of the figures, the recall precision curve is not monotonic. As an example, Table 8 shows the data for one of the curves in FIG. 9B. The data in Table 4 is sorted according to recall rates in ascending sequence. In the similarity range of 0.982 down to 0.952, no false detection occurs. Therefore, the 1-precision rates keep decreasing. However, in the similarity rage of 0.952 and 0.928, there is a false detection. Hence, 1-precision is increased.

TABLE 4

Data for curve "EDGE-Harris 3-Pt"

| Similarity | # Match | # Correct match | 1-precision | Recall |
|---|---|---|---|---|
| 0.982-1.000 | 2 | 1 | 0.50 | 0.09 |
| 0.978-0.982 | 1 | 1 | 0.33 | 0.18 |
| 0.976-0.978 | 1 | 1 | 0.35 | 0.27 |
| 0.972-0.976 | 1 | 1 | 0.20 | 0.36 |
| 0.970-0.972 | 2 | 2 | 0.14 | 0.54 |
| 0.968-0.970 | 1 | 1 | 0.12 | 0.63 |
| 0.958-0.968 | 2 | 2 | 0.10 | 0.81 |
| 0.952-0.958 | 1 | 1 | 0.09 | 0.90 |
| 0.928-0.952 | 2 | 1 | 0.38 | 1.00 |

Image Mosaicking

An image mosaic may combine a number of disparate images or video frames to form a comprehensive view of the scene. The mapping process required to construct the mosaic may be determined by the relative position and view angle of each image. An example of an image mosaic is shown in FIG. 10A (two disparate video frames) and FIG. 10B (image mosaic of the frames in FIG. 10A).

Image mosaicking is an important procedure in computer vision and computer graphics. It has wide applications in a variety of areas such as, but not limited to, video compression. Many video sequences include several fast moving target regions and a constant background. Rather than coding the background for every frame, a mosaic consisting of the background can be extracted and coded only once, with the majority of available bit rate allocated for other changing target regions. Thus, the compression efficiency can be improved dramatically.

Another example is terrain observation. For example, a camera aboard an unmanned air vehicle (UAV) can only capture a portion of a battlefield at any time. By using image sequences taken as the UAV flies over the battlefield, an image mosaicking process can produce a high-resolution image rendering of the entire battlefield.

Video editing and indexing is another application that may benefit from image mosaicking. Here, targets may be added to or removed from a video using image mosaicking. Additionally, image mosaicking may generate new video from new camera viewing angles.

Other applications include, without limitation, panoramic image generation, increasing the resolution or the field of view of the images, scene stabilization and change detection, medical imaging, and the like. One of ordinary skill in the art can recognize the benefits that other various applications may attain with a more accurate and substantially real-time image mosaicking process.

One main object of a mosaicking algorithm is to determine how a series of images overlap each other, thus generating a panoramic view of the scene. Most image mosaicking algorithm needs to extract or compute the following information:

1) how the images are captured; 2) how to represent the imagery data; 3) how to register the imagery data; and 4) how to generate a mosaic from the registered data. The available approaches differ in one or more of these aspects.

The majority of image mosaicking approaches may focus on images captured by a single or several unsynchronized pin-hole cameras, e.g., X-Slit cameras equipped with distortion-free lenses. Additionally, mosaicking of images from multiple synchronized cameras has also been studied. These approaches may vary from simple to complex, and are designed for either simple or real-world environments. In the simplest cases, cameras may be designed to move in certain patterns to avoid the difficulty of calculating how the images should overlap. For example, a camera may move along a cylinder or sphere about the optical center of the camera and may produce images at positions which uniformly sample the space.

Other approaches attempt to process images generated by arbitrary camera motion, but only for a planar scene. Alternatively, mosaic images may be generated from a 3-D scene with arbitrary camera motion. Mosaicking for images from multiple synchronized cameras has also been studied.

Due to the inherent large dimensionality of digital imagery, a mosaicking system may represent each image by a small number of features rather than by the raw pixels. Mosaicking approaches may be divided into region-based and point-based. In region-based approaches, an image may be clustered (by a segmentation procedure) into several regions such that within a region, pixels have similar optical properties. However, on images with less contrast or with complex scene content, it may be difficult for segmentation algorithms to produce reliable regions.

Point-based algorithms may choose several critical points from an image such as corners or edges. For many images, it may be easier to find consistent points rather than regions, although the region-based approach is more effective in reducing the dimensionality of the imagery.

Several transformation models may be used to describe the overlapping of the images, including a translation model, an affine model, a projective model, a bilinear model, a relative-projective model, or a biquadratic model, among others. For example, the affine model may accurately describe the transformations on a planar scene caused by camera motion including translation, rotation, and zoom. The projective model may represent the transformations on a 3D scene caused by any camera motion. In terms of computational complexity, the affine model may be much more efficient.

In one respect, mosaic may be generated each time a new image is processed or alternatively after all of the images have been collected and processed. Additionally, the reference coordinate system for the mosaic can either be fixed (static) or vary in time (dynamic).

In this disclosure, a novel image mosaicking technique operable in real-world conditions is presented. The real-world conditions or effects include, without limitation camera motion (e.g. translation, rotation, and zoom), disturbances from moving objects, annotations, and noise, luminance variations, moderate changes to the scene, and no operator input or intervention.

The techniques of the present disclosure may adopt a point-based approach. Numerical techniques may be used to determine the camera motion and to distinguish between those points belonging to the scene from those associated with a disturbance. An affine model may be adopted because of its computational simplicity. The approximation error resulted from the affine model may be corrected by a local-adaptive, fine-tuning step. The luminance change may also be compensated for in, for example, the fine-tuning step.

The mosaic may be generated progressively as new images are added. The proposed techniques may also operate in near real time, and requires no human input or intervention of any kind. Details of the proposed algorithm are presented below.

Proposed Image Mosaicking System

A 2D digital image may be formed when the light from a 3D target is projected onto a 2D image plane. The combination of all 3-D targets appearing in the image series is called the "scene." Different camera parameters, such as, but not limited to, orientation and field-of-view may result in differing images. For two non-identical images of the same scene, the difference in the camera parameters is called the "camera motion." Targets in a scene may be divided into "moving targets" and "background." A moving target is one in which its projections on the image series not only depend on the camera movement but also on its inherent motion as well. All targets other than moving targets may be considered the background of the scene.

Figure 11:
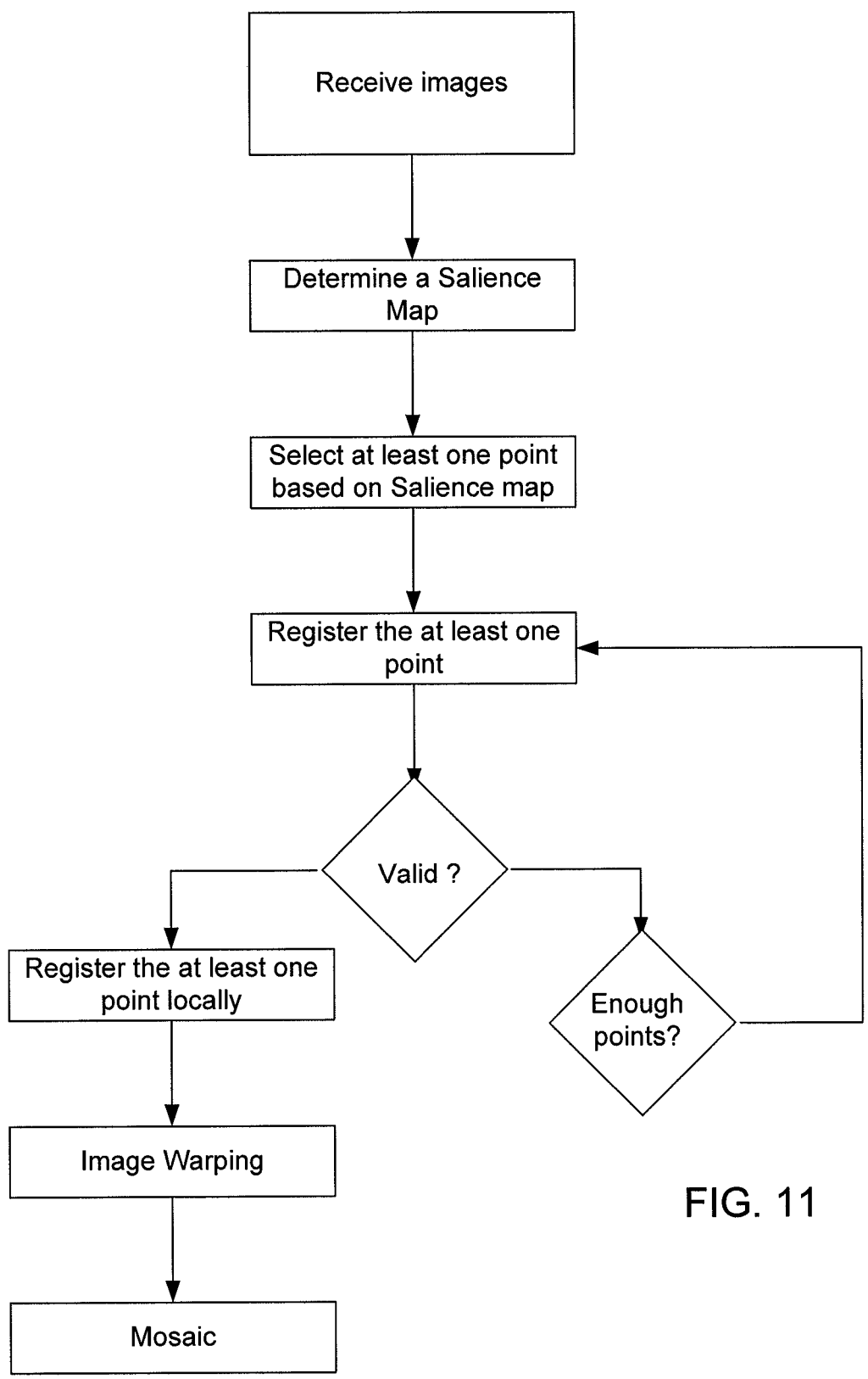
FIG. 11 shows a flowchart for constructing an image mosaic, in accordance with embodiments of the disclosure.

The overall block diagram of the proposed image mosaicking system is illustrated in FIG. 11. For each image frame, the saliency information (e.g., the possibility of a pixel being a corner point) may be calculated for every pixel, and the most salient pixels are chosen as the critical points. The critical pixels or the most salient pixels from different frames may subsequently be registered. Given the registered pixels, the camera motion may be estimated, which allows any poorly registered pixels or pixels corresponding to moving targets to be discarded. The refined registered pixels may subsequently be used to estimate an improved camera motion model, which may be verified by applying it to all critical pixels. If the majority of critical pixels may be accurately estimated by the refined model, the model may be considered valid. Otherwise, additional critical pixels may be chosen and the estimation process repeats. If the refined model cannot be validated after a predetermined number of critical pixels have been used, it may be concluded that the series of image frames cannot be registered. If the refined motion model is validated, a local adaptive procedure may be used to fine tune the matching between image frames. Finally, the image frames are warped and the frame-to-frame luminance change may be compensated, using for example Eq. 22. It is noted that the proposed algorithm may assume that the background occupies most of the pixels.

Saliency Information

The saliency information of a pixel may correspond to its likelihood of being a corner point. It is calculated by the algorithm proposed by above. The algorithm determines whether a pixel is in the interior, on the edge, or at the corner of a target by measuring the image around the pixel along different directions. Referring to FIGS. 12A through 12C, the saliency of a pixel, P, may be determined by moving a window around P and measuring the change of the image within the window. When P is in the interior of a target (FIG. 12A), moving the window along any direction may result in little or no change. When P is on an edge (FIG. 12B), moving the window in a perpendicular direction may result in a large image change, while moving the window along the edge may result in little or no change. When P is at a corner (FIG. 12C), the change may be significant in any direction.

Let $I(u, v)$ be the value of the pixel at the coordinates $(u, v)$, and let $W(u, v)$ be some smoothing function. For example, $W(u)_r = \exp(-(u^2+v^2)/2\sigma^2$ may be a 2D Gaussian smoothing function. The change, E, produced by a shift, (x, y), may be given by $$E(x, y) = \sum_{u,v} W(u, v)(I(x+u, y+v) - I(u, v))^2. \quad \text{Eq. 11}$$

A matrix M may be defined as $$M = \begin{bmatrix} \left(\frac{\partial I(x,y)}{\partial x}\right)^2, & \frac{\partial I(x,y)}{\partial x}\frac{\partial I(x,y)}{\partial y} \\ \frac{\partial I(x,y)}{\partial x}\frac{\partial I(x,y)}{\partial y}, & \left(\frac{\partial I(x,y)}{\partial x}\right)^2 \end{bmatrix}. \quad \text{Eq. 12}$$

The change in E may be determined by $$E = [x, y] M \begin{bmatrix} x \\ y \end{bmatrix} \quad \text{Eq. 13}$$

$$= [x, y] \begin{bmatrix} \left(\frac{\partial I(x,y)}{\partial x}\right)^2, & \frac{\partial I(x,y)}{\partial x}\frac{\partial I(x,y)}{\partial y} \\ \frac{\partial I(x,y)}{\partial x}\frac{\partial I(x,y)}{\partial y}, & \left(\frac{\partial I(x,y)}{\partial x}\right)^2 \end{bmatrix} \begin{bmatrix} x \\ y \end{bmatrix}.$$

Let $\alpha$ and $\beta$ be the eigenvalues of matrix M. From matrix theory and Eq. 13, $\alpha$ and $\beta$ may determine the way that E changes along different directions. If both $\alpha$ and $\beta$ are small, the pixel P may be in the anterior of the target. If the values $\alpha$ and $\beta$ are different, e.g., one being small and while the other is large, pixel P may be on the edge. If both $\alpha$ and $\beta$ are large, P may be at a corner.

Let Det(M) and Tr(M) be the determinant and trace of matrix M, respectively. Saliency R may be determined by $$R = \text{Det}(M) - k\,\text{Tr}(M) \quad \text{Eq. 14}$$

$$= \alpha\beta - k(\alpha + \beta)^2,$$

where k is a small positive number. It may be seen that a larger R implies larger $\alpha$ and $\beta$, which may increase the possibility of pixel P being a corner point.

Point Selection and Global Registration

A camera motion may estimated by selecting the most salient pixels and then registering these pixels from different video frames. Because the camera motion affects all pixels in the same manner, it is called global registration. To minimize the computational complexity, global registration may be carried out in a multi-resolution fashion. In other words, a small number of pixels may be chosen and subsequently registered. If the registration is successful, no further processing may be required. If the registration is not successful, additional pixels may be chosen and the registration step may be repeated. This process may continue until the number of chosen pixels is greater than a predetermined number.

The affine model may be adapted to model camera action although other projective models may also be used. With the affine model, a transformation form coordinates (x, y) to (u, v) may be defined as $$\begin{bmatrix} u \\ v \end{bmatrix} = \begin{bmatrix} a_{11} & a_{12} \\ a_{21} & a_{22} \end{bmatrix} \begin{bmatrix} x \\ y \end{bmatrix} + \begin{bmatrix} a_{13} \\ a_{23} \end{bmatrix}. \quad \text{Eq. 15}$$

A transformation matrix H may be defined as $$H = \begin{bmatrix} a_{11} & a_{12} & a_{13} \\ a_{21} & a_{22} & a_{23} \\ a_{21} & a_{22} & a_{23} \end{bmatrix}. \quad \text{Eq. 16}$$

The transformation of Eq. 15 using matrix H is as follows:

$$\begin{bmatrix} u \\ v \\ 1 \end{bmatrix} = H \begin{bmatrix} x \\ y \\ 1 \end{bmatrix} = \begin{bmatrix} a_{11} & a_{12} & a_{13} \\ a_{21} & a_{22} & a_{23} \\ a_{21} & a_{22} & a_{23} \end{bmatrix} \begin{bmatrix} x \\ y \\ 1 \end{bmatrix}. \quad \text{Eq. 17}$$

Suppose the $j^{th}$ video frame is being registered onto the $i^{th}$ video frame. On each frame, the most salient pixels, M, may be extracted. Then using specific features, the salient points of the $j^{th}$ frame may be registered to those from the $i^{th}$ frame. Usually, the number of registered pixels, N, is much less than the number of salient pixel, M. Let the ordered salient points from the jth frame be $$\begin{bmatrix} u_1 & u_2 & \ldots & u_N \\ v_1 & v_2 & \ldots & v_N \end{bmatrix} \quad \text{Eq. 18}$$

and the registered salient points in the same order of the $i^{th}$ frame may be $$\begin{bmatrix} x_1 & x_2 & \ldots & x_N \\ y_1 & y_2 & \ldots & y_N \end{bmatrix}. \quad \text{Eq. 19}$$

The transformation matrix H may be determined by solving the equation:

$$\begin{bmatrix} u_1 & u_2 & \ldots & u_N \\ v_1 & v_2 & \ldots & v_N \end{bmatrix} = \begin{bmatrix} a_{11} & a_{12} & a_{13} \\ a_{21} & a_{22} & a_{23} \end{bmatrix} \begin{bmatrix} x_1 & x_2 & \ldots & x_N \\ y_1 & y_2 & \ldots & y_N \\ 1 & 1 & \ldots & 1 \end{bmatrix}. \quad \text{Eq. 20}$$

The registered pixels may include those from moving targets or may result from imprecise registration. The outlier pixels may be included as follows where the matrix may be the coordinates of the points in Eq. 19 transformed according Eq. 20. For every i from 1 to N, the Euclidean distance between $[u_i, v_i]$ may be computed. If the distance is too large, then the point may be discarded.

$$\begin{bmatrix} \hat{u}_1 & \hat{u}_2 & \ldots & \hat{u}_N \\ \hat{v}_1 & \hat{v}_2 & \ldots & \hat{v}_N \end{bmatrix}$$

Based on the refined points, a new transformation matrix, H, may be calculated. To verify the validity of the new H, all salient pixels are transformed. If most of the transformed pixels have a salient pixel nearby, H is validated. Otherwise, H may be discarded and the registration process repeats with a larger M.

Local-Adaptive Registration and Image Warping

A calculated transformation matrix may facilitate the projection of a planar image from one 2D space to another. Additionally, real-world images may be formed when 3D targets are projected onto a 2D space. As the camera moves, the projection may be changed and cannot be accurately described by H. Thus, local-adaptive registration is employed to cope with the aforementioned change.

The local-adaptive registration stage works as follows. Let the pixel at position $(\hat{u}, \hat{v})$ in the $i^{th}$ frame result from the transformation of the pixel at position $(x, y)$ in the $j^{th}$ frame. In a window with a predefined size (e.g., 5×5), a pixel with a luminance value closest to $I(x, y)$ may be found. Suppose this pixel is located at $(\tilde{u}, \tilde{v})$. Let $\Delta u = \tilde{u} - \hat{u}$ and $\Delta v = \tilde{v} - \hat{v}$. After calculating the displacement, $\Delta u$ and $\Delta v$, for all pixels, the displacement image may be smoothed using Gaussian filtering.

Let $H_{ij}$ be the transformation matrix from the jth frame to the ith frame. If the first frame is chosen as the manifold of the mosaic, the transformation matrix from the jth frame to the mosaic is $$H_{1j} = H_{12} H_{23} \ldots H_{(j-i)}.$$  Eq. 21.

The values of the registered pixels may be used to correct any change in luminance. Specifically, the ratio $\eta$ as defined in Eq. 21 may be used to normalize the pixel values during the image warping process, where $$\eta = \frac{\sum_k I(\tilde{u}_k, \tilde{v}_k)}{\sum_k I(x_k, y_k)}$$  Eq. 22

Let the pixel at position $(\tilde{u}, \tilde{v})$ in the $i^{th}$ frame results from the transformation of the pixel at position $(x, y)$ in the $j^{th}$ frame.

Experimental Results and Conclusions

The image mosaicking technique was used to test real-world video sequences. These sequences were produced by cameras with arbitrary motion, and with significant disturbances such as moving targets, annotations, and compression artifacts. All video sequences were 320×240 at 15 frames per second.

Figure 13A:
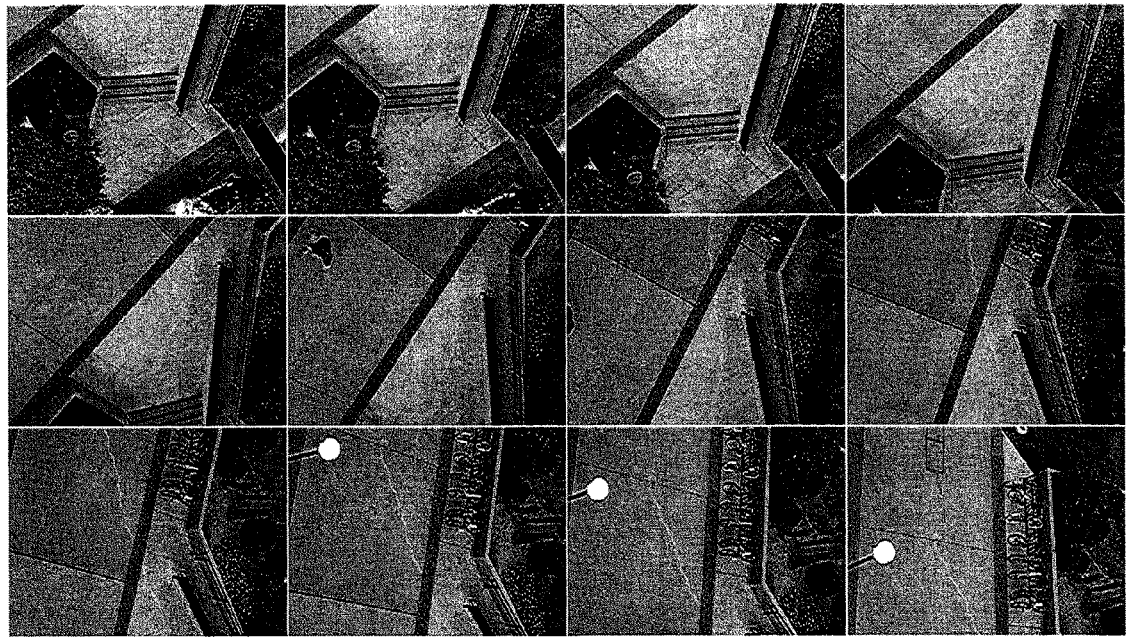
FIGS. 13A and 13B show video frames and a mosaic of the video frames, respectively, in accordance with embodiments of the disclosure.
Figure 13B:
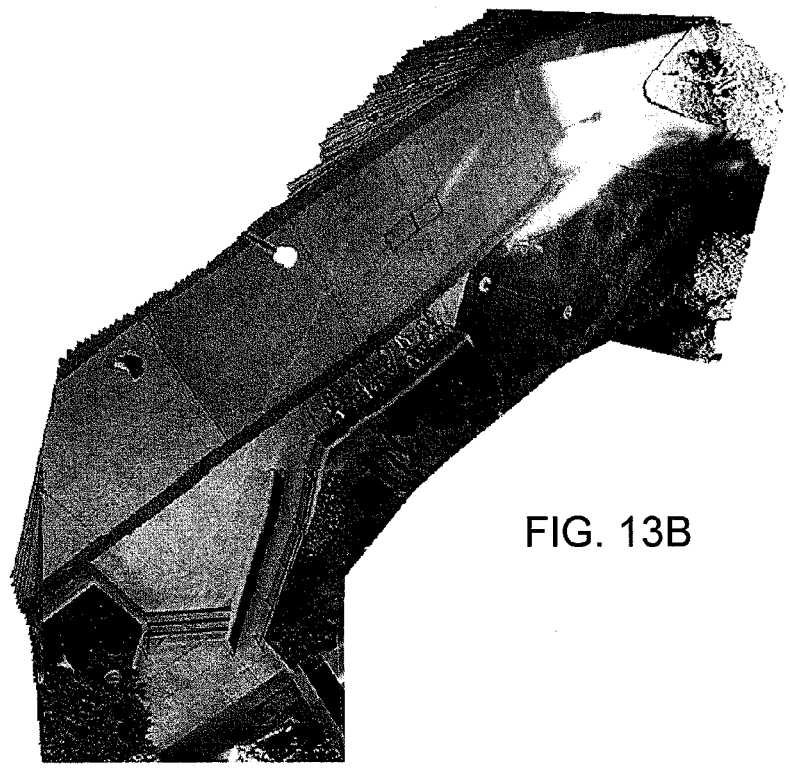
Figure 14A:
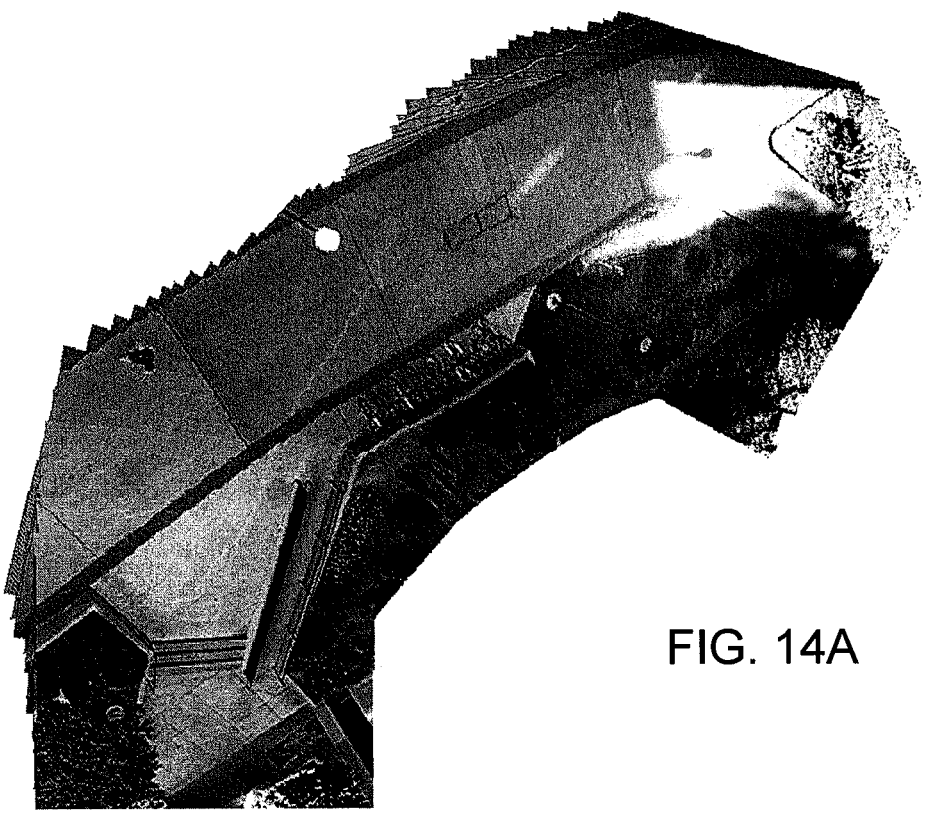
FIGS. 14A and 14B a mosaic for the frames shown in FIG. 13A at different frame rates, in accordance with embodiments of the disclosure.
Figure 14B:
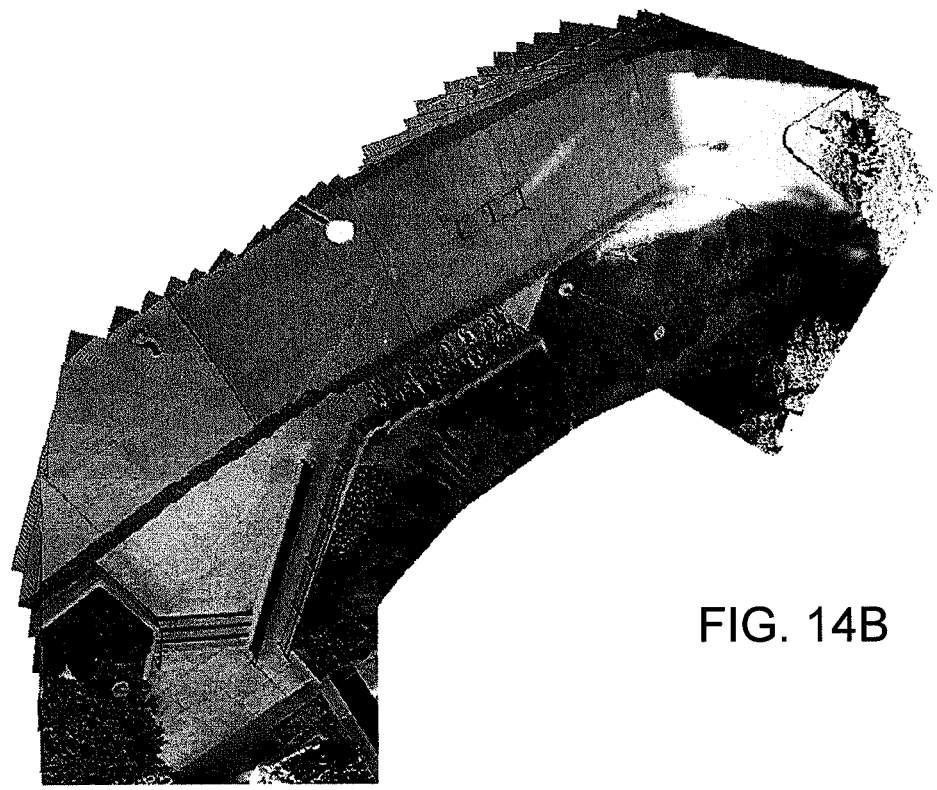

FIG. 13A shows a color video with translation and rotation. The mosaic by using all video frames is shown in FIG. 13B. If some image frames are skipped, the overlapping area in the images will be less and hence are more difficult to register. The mosaics by using ⅓ and ⅕ frames, at the rates of 5 and 3 frames per second, are shown in FIGS. 14A and 14B, respectively. Comparing FIGS. 14A and 14B, with FIG. 13B it can be seen that the mosaic has little change.

Figure 15A:
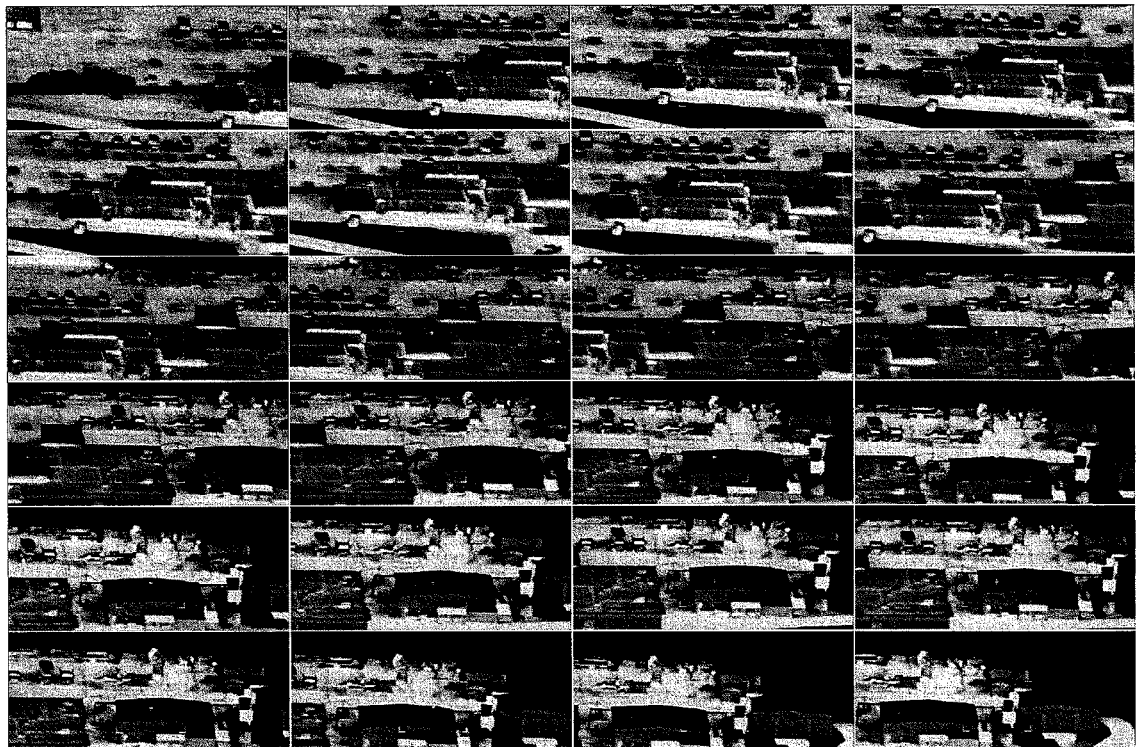
FIGS. 15A and 15B show a noisy video frames and a mosaic of the video frames, respectively, in accordance with embodiments of the disclosure.
Figure 15B:

FIGS. 15A and 15B show a noisy gray scale video and its mosaic, respectively. FIGS. 16A and 16B show a video with a fast moving vehicle and an image mosaic of the video, respectively. Note that despite these disturbances, the mosaics are very accurate. Also note that our algorithm is able to remove the moving targets as well as most of the noise.

The computational complexity of the proposed algorithm is largely determined by the number of salient points, M. For example, it takes about 0.5 second to process a frame of video on a 2.4-GHZ P4 CPU when M=50, and about 1 second per frame when M=75.

The present disclosure provides methods for constructing a mosaic from a sequence of images. The technique is robust to perturbations such as annotations, moving targets, and compression artifacts, and requires no prior information and no user intervention. Experimental results confirm accurate mosaics with real-world video sequences, are robust to image perturbations, and are computationally tractable.

Techniques of this disclosure may be accomplished using any of a number of programming languages. For example, the steps shown in, for example, FIG. 11 and/or the calculation of any of Eqs. 1 through 22 may be performed on a computer readable medium. Suitable languages include, but are not limited to, BASIC, FORTRAN, PASCAL, C, C++, C#, JAVA, HTML, XML, PERL, etc. An application configured to carry out the invention may be a stand-alone application, network based, or wired or wireless Internet based to allow easy, remote access. The application may be run on a personal computer, a data input system, a point of sale device, a PDA, cell phone or any computing mechanism.

Computer code for implementing all or parts of this disclosure may be housed on any processor capable of reading such code as known in the art. For example, it may be housed on a computer file, a software package, a hard drive, a FLASH device, a USB device, a floppy disk, a tape, a CD-ROM, a DVD, a hole-punched card, an instrument, an ASIC, firmware, a "plug-in" for other software, web-based applications, RAM, ROM, etc. The computer code may be executable on any processor, e.g., any computing device capable of executing instructions according to the methods of the present disclosure. In one embodiment, the processor is a personal computer (e.g., a desktop or laptop computer operated by a user). In another embodiment, processor may be a personal digital assistant (PDA), a gaming console, a gaming device, a cellular phone, or other handheld computing device. $\hat{i}$, $\hat{j}$, and $\hat{k}$ In some embodiments, the processor may be a networked device and may constitute a terminal device running software from a remote server, wired or wirelessly. Input from a source or other system components may be gathered through one or more known techniques such as a keyboard and/or mouse, and particularly may be received form image device, including but not limited to a camera and/or video camera. Output, such as the image mosaic may be achieved through one or more known techniques such as an output file, printer, facsimile, e-mail, web-posting, or the like. Storage may be achieved internally and/or externally and may include, for example, a hard drive, CD drive, DVD drive, tape drive, floppy drive, network drive, flash, or the like. The processor may use any type of monitor or screen known in the art, for displaying information. For example, a cathode ray tube (CRT) or liquid crystal display (LCD) can be used. One or more display panels may also constitute a display. In other embodiments, a traditional display may not be required, and the processor may operate through appropriate voice and/or key commands.

With the benefit of the present disclosure, those having ordinary skill in the art will comprehend that techniques claimed here may be modified and applied to a number of additional, different applications, achieving the same or a similar result. The claims cover all such modifications that fall within the scope and spirit of this disclosure.

REFERENCES

Each of the following references is incorporated by reference in its entirety:

Adams and Bischof, *IEEE Trans. Pattern Anal. Mach. Intel.*, 16(6):641-647, 1994.

Antonini et al., *IEEE Trans. Image Processing*, 1(2):205-220, 1992.

Bella et al., *IEEE Trans. Nucl. Sci.*, 44(3):1355-1361, 1997.
Belongie et al., *IEEE Trans. Pattern Anal. Mach. Intel.*, 24(4): 509-522, 2002.
Berridge and Talbert, *Proc. National Aerospace Elect.*, 794-800, 2000.
Bhanu et al., *IEEE Trans. Image Processing*, 6(1):1-6, 1997.
Bhatia and Wolf, *Proc. Cambridge Philos. Soc.*, 50:40-48, 1954.
Boshra and Bhanu, *IEEE Trans. Pattern Anal. Mach. Intel.*, 22(9)956-969, 2000.
Can et al., *IEEE Trans. Pattern Anal. Mach. Intel.*, 24(3):347-364, 2002.
Can et al., *IEEE Trans. Pattern Anal. Mach. Intel.*, 24:412-419, 2002.
Castleman, In: *Digital Image Processing*, NY, Prentice Hall, 1996.
Chen, In: *Quicktime vr-an image-based approach to virtual environment navigation,"* Computer Graphics (SIGGRAPH), 29-38, 1995.
Chong et al., *Pattern Recognition*, 36(3):731-742, 2003.
Chong et al., *Pattern Recognition*, 36(8):1765-1773, 2003.
Christopoulos et al., *IEEE Signal Processing Lett.*, 7(9):247-249, 2000.
Christoyianni et al., In: *Automatic detection of abnormal tissue in mammography*, Proc. IEEE Intl. Conf. on Image Processing (ICIP), Greece, 2:877-880, 2001.
Coorg and Teller, *Intl. J Computer Vision*, 37(3):259-273, 2000.
Doulamis et al., *IEEE Trans. Circuits Syst. Video Technol.*, 8(8):928-934, 1998.
Dudgeon, *Digital Signal Processing*, 10(4):269-285, 2000.
Engels, In: *Numerical Quadrature and Cubature*, London, Academic Press, 1980.
Fast watershed aided by target detection, Proc. SPIE's 16th Annual Intl. Symposium on Aerospace Defense Sensing, Simulation, and Controls, FL, 4735:1-12, 2002.
Faugeras, In: *Three-Dimensional Computer Vision*, MIT Press, 1993.
Flamer et al, In: *Real-time scene stabilization and mosaic construction*, IEEE Workshop on Applications of Computer Vision, FL, 54-62, 1994.
Freeman and Adelson, *IEEE Trans. Pattern Anal. Mach. Intel.*, 13(9):891-906, 1991.
Giircan et al., *IEEE Signal Processing Lett.*, 4(8):213-216, 1997.
Gool et al., In: *Affine/photometric invariants for planar intensity patterns*, 4th European Conf. on Computer Vision, England, 642-651, 1996.
Gope et al., In: *Zernike moment invariants based photo-identification using fisher discriminant model*, IEEE Conf. Engineering in Medicine and Biology, CA, 2004.
Gu et al., *Pattern Recognition*, 35(12):2905-2911, 2002.
Hansen et al., In: *Real-time scene stabilization and mosaic construction*, IEEE Workshop on Applications of Computer Vision, FL, 54-62, 1994.
Harris and Stephens, In: *A combined corner and edge detector*, Proc, 4$^{th}$ Alvey Vision Conference, NH, 147-151, 1988.
Hartley and Zisserman, In: Multiple View Geometry in Computer Vision, 2$^{nd}$ Ed., United Kingdom, Cambridge University Press, 2003.
Hu, *IRE Trans. Information Theory*, 8:179-187, 1962.
Huxley, *Proc. London Math. Soc.*, 60(3):471-502, 1990.
Irani et al., In: *Mosaic based representations of video sequences and their applications*, Intl. Conf. on Computer Vision, MA, 605-611, 1995.
Irani et al., Signal Processing: *Image Communication*, 7:529-552, 1995.
Iwaniec and Mozzochi, *J Number Theory*, 29:60-93, 1988.
Jackson, In: *Fourier Series and Orthogonal Polynomials*, NYork, Mathematical Association of America, 1941.
Jahne and Hauilecker, In: *Computer Vision and Applications: A Guide for Students and Practitioners*, California, Academic Press, 2000.
Jdhne, In: *Digital Image Processing. Concepts, Algorithms, and Scientific Applications*, 2$^{nd}$ Ed., Springer-Verlag Berlin Heidelberg, 1993.
Jouan et al., *IEEE Trans. Med. Imag.*, 9(1):5-10, 1990.
Kamgar-Parsi and Kamgar-Parsi, *IEEE Trans. Pattern Anal. Mach. Intel.*, 11(9):929-940, 1989.
Kan and Srinath, *Pattern Recognition*, 35(1):143-154, 2002.
Ke and Sukthankar, In: *Pca-sift: A more distinctive representation for local image descriptors,"* IEEE Conf. on Computer Vision and Pattern Recognition, Washington, 511-517, 2004.
Khan and Shah, *IEEE Trans. Pattern Anal. Mach. Intel.*, 25(10):1355-1360, 2003.
Khotanzad and Hong, *IEEE Trans. Pattern Anal. Mach. Intel.*, 12(5):489-497, 1990.
Kim and Park, *IEEE Trans. Med. Imag.*, 18(3):231-238, 1999.
Klette and Zunic, In: *Multigrid error bounds for moments of arbitrary order*, IEEE Conf. Pattern Recognition (ICPR), Spain, 782-785, 2000.
Klotz et al., *IEEE Trans. Med. Imag.*, 8(4):371-376, 1989.
Koenderink and van Doom, *Biological Cybernetics*, 55(6): 367-375, 1987.
Korteling and van der Borg, *IEEE Trans. Syst., Man, Cybern.*, 27(2):256-262, 1997.
Lazebnik et al., In: *Sparse texture representation using affineinvariant neighborhoods*, IEEE Conf. on Computer Vision and Pattern Recognition, WI, 2:319-324, 2003.
Li et al., In: *Multiresolution object-of-interest detection for images with low depth of field*, Proc. Intl. Conf. on Image Analysis and Processing (ICIAP), Italy, 32-37, 1999.
Liao and Pawlak, *IEEE Trans. Pattern Anal. Mach. Intel.*, 20(12):1358-1364, 1998.
Lie, *IEEE Trans. Image Processing*, 4(7):1036-1042, 1995.
Lin et al., In: *Automatic target detection in (auv) imagery using image formation conditions*, Proc. SPIE, FL, 5094: 136-147, 2003.
Lin et al., In: *Knowledge-based hierarchical region-of-interest detection,"* IEEE Intl. Conf. on Acoustics, Speech, and Signal Processing (ICASSP), FL, 4:3628-3631, 2002.
Lin et al., In: *Migrating orthogonal rotation-invariant moments from continuous to discrete space*, IEEE Intl. Conf. on Acoustics, Speech, and Signal Processing (ICASSP), PA, 245-248, 2005.
Liu and Nocedal, *Mathematical Program. B*, 45:503-528, 1989.
Liu et al., *IEEE Trans. Biomed. Eng.*, 49(4):372-383, 2002.
Lowe, In: *Object recognition from local scale-invariant features*, Proc. Intl. Conf. on Computer Vision, Greece, 1150-1157, 1999.
Ma et al., *Optical Engineering*, 41(11), 2002.
Mann and Picard, In: *Virtual bellows: Constructing high quality images from video*, IEEE Intl. Conf. on Image Processing, Texas, 363-367, 1997.
McMillan and Bishop, In: *Plenoptic modeling: An image based rendering system*, Computer Graphics (SIGGRAPH), 39-46, 1995.
Mikolajczyk and Schmid, In: *A performance evaluation of local descriptors*, Intl. Conf. on Computer Vision & Pattern Recognition, 2:257-263, 2003.

Moffitt and Mikhail, In: *Photogrammetry*, 3rd Ed., NY, Harper & Row, 1980.
Mohan et al., *IEEE Trans. Pattern Anal. Mach. Intel.*, 23(4): 349-361, 2001.
Mukundan and Ramakrishnan, *Pattern Recognition*, 28(9): 1433-1442, 1995.
Nicolas, *IEEE Trans. Image Processing*, 10(8):1239-1251, 2001.
Nocedal and Wright, In: *Numerical Optimization*, NY, Springer, 1999.
Pal and Pal, *Pattern Recognition*, 26(9):1277-1294, 1993.
Pal et al., *IEEE Trans. Fuzzy Syst.*, 9(1):44-52, 2001.
Pawlak and Liao, *IEEE Trans. Inform. Theory*, 48(10):2376-2753, 2002.
Peleg et al., *IEEE Trans. Pattern Anal. Mach. Intel.*, 22(10): 1144-1154, 2000.
Peleg et al., *IEEE Trans. Pattern Anal. Mach. Intel.*, 23(3): 279-290, 2001.
Pietka et al., *IEEE Trans. Med. Imag.*, 12(1):44-49, 1993.
Pietka et al., *IEEE Trans. Med. Imag.*, 20(8):715-729, 2001.
Polakowski et al., *IEEE Trans. Med. Imag.*, 16(6):811-819, 1997.
Privitera and Stark, *IEEE Trans. Pattern Anal. Machine Intell.*, 22(9):970-982, 2000.
Qi et al., *Optical Engineering*, 39(5):1267-1274, 2000.
Rothe et al., *IEEE Trans. Pattern Anal. Mach. Intel.*, 18(4): 366-376, 1996.
Sahiner et al., *IEEE Trans. Med. Imag.*, 15(5):598-610, 1996.
Sawhney and Ayer, *IEEE Trans. Pattern Anal. Mach. Intel.*, 18(8):814-830, 1996.
Sawhney and Kumar, *IEEE Trans. Pattern Anal. Mach. Intel.*, 21(3):235-243, 1999.
Schaffalitzky and Zisserman, In: *Multi-view matching for unordered image sets*, 7th European Conf. on Computer Vision, Denmark, 414-431, 2002.
Schechner and Nayar, *IEEE Trans. Pattern Anal. Mach. Intel.*, 24(10):1334-1348, 2002.
Schechner and Nayar, *Intl. J Computer Vision*, 53(3):245-267, 2003.
Schmid et al., *Intl. J Computer Vision*, 37(2):151-172, 2000.
Sebastian et al., *IEEE Trans. Pattern Anal. Mach. Intel.*, 26(5):550-571, 2004.
Shah and Aggarwal, *Pattern Recognition*, 29(11):1775-1788, 1996.
Sharp et al., In: *A vision system for landing an unmanned aerial vehicle*," IEEE Intl. Conf. on Robotics and Automation (ICRA), Korea, 1720-1727, 2001.
Sheng and Shen, *J Optical Soc. Amer.*, 11(6):1748-1757, 1994.
Shum and Szeliski, *Intl. J Computer Vision*, 36(2):101-130, 2000.
Solka et al., *IEEE Trans. Pattern Anal. Machine Intel.*, 20(8): 852-857, 1998.
Sonka et al., In: *Image Processing, Analysis, and Machine Vision*, 2nd Ed., California, PWS Pub., 1999.
Stough and Brodley, *IEEE Trans. Image Processing*, 10(3): 419-426, 2001.
Szeliski, *IEEE Computer Graphics and Applications*, 16:22-30, 1996.
Teague, *J. Opt. Soc. Am.*, 70(8):920-930, 1980.
Teh and Chin, *Computer Vision, Graphics and Image Proc.*, 33:318-326, 1986.
Teh and Chin, *IEEE Trans. Pattern Anal. Mach. Intel.*, 10(4): 496-513, 1988.
Tell and Carlsson, In: *Wide baseline point matching using affine invariants computed from intensity profiles*, 6th European Conf. on Computer Vision, Ireland, 814-828, 2000.
Toklu et al., *IEEE Trans. Image Processing*, 9(9):1617-1630, 2000.
Tsai, In: *An efficient and accurate camera calibration technique for 3-d machine vision*, IEEE Conf. Computer Vision and Pattern Recognition (CVPR), FL, 364-374, 1986.
Vincent and Soille, *IEEE Trans. Pattern Anal. Mach. Intel.*, 13(6):583-598, 1991.
Wallin and Kubler, *IEEE Trans. Pattern Anal. Mach. Intel.*, 17(11):1106-1110, 1995.
Wang and Healey, *IEEE Trans. Image Processing*, 7(2):196-203, 1998.
Wei and Ma, *IEEE Trans. Pattern Anal. Mach. Intel.*, 16(5): 469-480, 1994.
Weng et al., In: *Calibration of stereo cameras using a nonlinear distortion model*, IEEE Conf. Pattern Recognition (ICPR), NJ, 1:246-253, 1990.
Ye and Peng, *J. Opt. A: Pure Appl. Opt.*, 4:606-614, 2002.
Zernike, *Physica*, 1:689-704, 1934.
Zhang and Desai, *IEEE Trans. Image Processing*, 10(7): 1020-1030, 2001.
Zhang and Lu, *Multimedia Systems*, 9(1):15-30, 2003.
Zhang et al., *IEEE Trans. Syst., Man, Cybern. B*, 26(4):619-627, 1996.
Zhu et al., *IEEE Trans. Pattern Anal. Mach. Intel.*, 26(2):226-237, 2004.
Zomet et al., *IEEE Trans. Pattern Anal. Mach. Intel.*, 25(6): 741-754, 2003.

The invention claimed is:

1. A method comprising:
providing at least a first image and a second image;
selecting, in a processor, a similar object in the first image and the second image;
selecting, in the processor, a first pair of points of interest from the first image and a second pair of points of interest from the second image related to the selected object, where each of the points of interest is a corner of the object;
generating, in the processor, a first intensity profile of a first line connecting the first pair of points of interest;
generating, in the processor, a second intensity profile of a second line connecting the second pair of points of interest; and
comparing, in the processor, the first intensity profile of the first line to the second intensity profile of the second line.

2. The method of claim 1, where the first and second images are static images or dynamic images.

3. The method of claim 1, where at least one of the first pair of points of the first image and the second pair or points of the second image correspond to a corner pixel of the first image and second image respectively.

4. The method of claim 1, further comprising selecting a first additional point of interest in the first image and a second additional point of interest in the second image;
generating a first additional intensity profile of a first pair of lines between the first additional point of interest and the first pair of points of interest, wherein a first triangle is formed by the first line connecting the first pair of points of interest and the first pair of lines;
generating a second additional intensity profile of a second pair of lines between the second additional point of interest and the second pair of points of interest, wherein a second triangle is formed by the second line connecting the second pair of points of interest and the second pair of lines; and generating a first intensity profile of the first triangle;

generating a second intensity profile of the second triangle; and comparing the first intensity profile of the first triangle to the second intensity profile of the second triangle.

5. The method of claim 1, further comprising generating an image mosaic.

6. The method of claim 5, where generating the image mosaic comprises correcting luminance variance between the first image and the second image.

7. A non-transitory computer or machine readable medium embodying a program, that when executed by a processor, is configured to cause the processor to perform the steps comprising:

providing at least a first image and a second image;

selecting, in the processor, a similar object in the first image and the second image;

selecting, in the processor, a first pair of points of interest from the first image and a second pair of points of interest from the second image related to the selected object, where each of the points of interest is a corner of the object;

generating, in the processor, a first intensity profile of a first line connecting the first pair of points of interest;

generating, in the processor, a second intensity profile of a second line connecting the second pair of points of interest; and comparing, in the processor, the first intensity profile of the first line to the second intensity profile of the second line.

8. A method comprising:

determining, in a processor, a first intensity profile of a line connecting two points of interest of an image, where each of the points of interest is a corner of an object;

determining, in the processor, a second intensity profile of a line connecting two points of interest from a surrounding image, where each of the points of interest is a corner of an object; and using the first and second intensity profiles for generating, in the processor, an image mosaic of two or more images.

9. The method of claim 8, where detecting surrounding images comprises determining a window around the selected pixel.

10. The method of claim 8, where using the selected pixel for generating an image mosaic comprises registering the selected pixel; and generating an image mosaic if the registering of the selected pixel is successful.

11. The method of claim 8, where determining a type of pixel comprises determining a corner pixel.

12. The method of claim 8, further comprising where generating the image mosaic comprises correcting luminance variance between the first image and the second image.

13. A non-transitory computer or machine readable medium embodying a program, that when executed by a processor, is configured to cause the processor to perform the steps comprising:

determining, in the processor, a first intensity profile of a line connecting two points of interest of an image, where each of the points of interest is a corner of an object;

determining, in the processor, a second intensity profile of a line connecting two points of interest from a surrounding image, where each of the points of interest is a corner of an object; and using the first and second intensity profiles for generating, with the processor, an image mosaic of two or more images.

14. A processor-implemented method for image mosaicking comprising:

determining, in a processor, a first pixel intensity profile of pixels along a first line between two points of interest of a first image;

determining, in the processor, a second pixel intensity profile of pixels along a second line between two points of interest of a second image, the second image being similar to the first image; and mosaicking the first and second image if the first and second pixel intensity profiles from the first and second images are successfully registered, with the processor, where each of the points of interest is a corner of an object.

15. The method of claim 14, where selecting one salient pixel of the first image comprises selecting an interior pixel, an edge pixel, or a corner pixel.

16. The method of claim 14, where selecting one salient pixel of the second image comprises selecting an interior pixel, an edge pixel, or a corner pixel.

17. The method of claim 14, where the first image and the second image are static images or dynamic images.

18. The method of claim 14, further comprising correcting luminance variance between the first image and the second image.

19. A non-transitory computer or machine readable medium embodying a program, that when executed by a processor, is configured to cause the processor to perform the steps comprising:

determining, in the processor, a first pixel intensity profile of pixels along a first line between two points of interest of a first image;

determining, in the processor, a second pixel intensity profile of pixels along a second line between two points of interest of a second image, the second image being similar to the first image; and mosaicking, with the processor, the first and second image if the first and second pixel intensity profiles from the first and second images are successfully registered, where each of the points of interest is a corner of an object.

* * * * *

UNITED STATES PATENT AND TRADEMARK OFFICE
CERTIFICATE OF CORRECTION

| | | |
|---|---|---|
| PATENT NO. | : 8,417,060 B2 | Page 1 of 1 |
| APPLICATION NO. | : 11/688660 | |
| DATED | : April 9, 2013 | |
| INVENTOR(S) | : Glen Patrick Abousleman et al. | |

It is certified that error appears in the above-identified patent and that said Letters Patent is hereby corrected as shown below:

In the Claims

In claim 3, column 22, line 54, delete "second pair or points" and insert --second pair of points-- therefor.

Signed and Sealed this
Twenty-ninth Day of April, 2014

Michelle K. Lee
*Deputy Director of the United States Patent and Trademark Office*

UNITED STATES PATENT AND TRADEMARK OFFICE
CERTIFICATE OF CORRECTION

| | | Page 1 of 1 |
|---|---|---|
| PATENT NO. | : 8,417,060 B2 | |
| APPLICATION NO. | : 11/688660 | |
| DATED | : April 9, 2013 | |
| INVENTOR(S) | : Abousleman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1235 days.

Signed and Sealed this
Ninth Day of December, 2014

Michelle K. Lee
*Deputy Director of the United States Patent and Trademark Office*